(12) United States Patent
Ruoff et al.

(10) Patent No.: US 9,412,484 B2
(45) Date of Patent: Aug. 9, 2016

(54) ULTRACAPACITOR WITH A NOVEL CARBON

(71) Applicants: Rodney S. Ruoff, Austin, TX (US); Yanwu Zhu, Austin, TX (US); Meryl D. Stoller, Austin, TX (US); Shanthi Murali, Austin, TX (US)

(72) Inventors: Rodney S. Ruoff, Austin, TX (US); Yanwu Zhu, Austin, TX (US); Meryl D. Stoller, Austin, TX (US); Shanthi Murali, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 231 days.

(21) Appl. No.: 13/782,329

(22) Filed: Mar. 1, 2013

(65) Prior Publication Data
US 2013/0235509 A1    Sep. 12, 2013

Related U.S. Application Data

(63) Continuation-in-part of application No. 12/875,880, filed on Sep. 3, 2010, now abandoned, and a continuation-in-part of application No. PCT/US2011/036164, filed on May 12, 2011, which is a continuation of application No. 12/875,880, filed on Sep. 3, 2010, now abandoned.

(60) Provisional application No. 61/240,120, filed on Sep. 4, 2009, provisional application No. 61/477,819, filed on Apr. 21, 2011.

(51) Int. Cl.
| H01B 1/04 | (2006.01) |
| C01B 31/08 | (2006.01) |
| H01M 4/133 | (2010.01) |
| H01G 11/46 | (2013.01) |
| H01G 11/24 | (2013.01) |
| H01G 11/34 | (2013.01) |
| C01B 31/04 | (2006.01) |
| C01B 31/12 | (2006.01) |

(52) U.S. Cl.
CPC .............. *H01B 1/04* (2013.01); *C01B 31/0423* (2013.01); *C01B 31/12* (2013.01); *H01G 11/24* (2013.01); *H01G 11/34* (2013.01); *H01G 11/46* (2013.01); *H01M 4/133* (2013.01); *Y02E 60/13* (2013.01); *Y10T 428/2982* (2015.01)

(58) Field of Classification Search
CPC ........... H01B 1/00; H01B 1/04; H01M 4/133; C01B 31/08
See application file for complete search history.

(56) References Cited

U.S. PATENT DOCUMENTS

| 6,256,190 B1 | 7/2001 | Wei et al. |
| 7,658,901 B2 | 2/2010 | Prud'Homme et al. |

(Continued)

FOREIGN PATENT DOCUMENTS

| WO | 2005/084172 | 9/2005 |
| WO | 2009/134707 | 11/2009 |

OTHER PUBLICATIONS

Kang et al "Restoring electrical conductivity of dielectrophoretically assembled graphite oxide sheets . . . ", Carbon 47 (2009) 1520-1525.*
International Application No. PCT/US2011/036164 PCT International Search Report dated Jan. 18, 2012 with Publication No. WO2012/030415; 53 pages.
International Preliminary Report on Patentability; PCT/US2010/047821; pp. 6, Mar. 15, 2012.
Park and Ruoff, "Chemical methods for the production of graphenes," Nat. Nanotechnol:29 (Mar. 2009); pp. 9, Mar. 2009.

(Continued)

*Primary Examiner* — Mark Kopec
(74) *Attorney, Agent, or Firm* — Baker Botts L.L.P.

(57) ABSTRACT

Disclosed is a carbon material that can be useful, for example, in ultracapacitors. Also disclosed are applications and devices containing the carbon material.

30 Claims, 16 Drawing Sheets

(56) References Cited

U.S. PATENT DOCUMENTS

| | | |
|---|---|---|
| 7,852,612 B2 | 12/2010 | Zhao |
| 8,153,240 B2 | 4/2012 | Wang et al. |
| 8,501,858 B2 * | 8/2013 | Drzal et al. ............ 524/495 |
| 2008/0180882 A1 | 7/2008 | Miller et al. |
| 2008/0232028 A1 | 9/2008 | Zhao |
| 2008/0258359 A1 | 10/2008 | Zhamu et al. |
| 2009/0011204 A1 | 1/2009 | Wang et al. |
| 2009/0026086 A1 | 1/2009 | Zhamu et al. |
| 2010/0035093 A1 | 2/2010 | Ruoff et al. |
| 2010/0055025 A1 | 3/2010 | Jang et al. |
| 2010/0147188 A1 | 6/2010 | Mamak et al. |
| 2011/0017955 A1 * | 1/2011 | Zhamu et al. ............ 252/511 |
| 2011/0183180 A1 * | 7/2011 | Yu et al. ............ 429/128 |

OTHER PUBLICATIONS

Molina-Sabio, M. and F. Rodríguez-Reinoso, Colloids and Surfaces A: Physicochemical and Engineering Aspects, 241(1-3):15-25 (2004).

Marsh, H. and F. Rodríguez-Reinoso, Activation Processes (Chemical), in Activated Carbon. Elsevier Science Ltd: Oxford. p. 322-365 (2006).

Hu, Z., et al., Carbon, 39(6):877-886 (2001).

Olivares-Marín, M., et al., Carbon, 44(11): 347-2350 (2006).

Molina-Sabio, et al., Carbon, 41(11): 2113-2119 (2003).

Lillo-Ródenas, et al., Carbon, 41(2): 267-275 (2003).

Appetecchi, Giovanni, et al., Electrochimica Acta 54:1325-1332 (2009).

* cited by examiner

US 9,412,484 B2

ULTRACAPACITOR WITH A NOVEL CARBON

PRIORITY CLAIM

This application is a continuation-in-part under 35 U.S.C. §120 of U.S. patent application Ser. No. 12/875,880 filed Sep. 3, 2010, now abandoned; which claims priority under 35 U.S.C. §119 to U.S. Provisional Patent Application Ser. No. 61/240,120 filed Sep. 4, 2009; and this application is a continuation-in-part of PCT application US2011/036164 filed May 12, 2011; which is a continuation application of abandoned U.S. patent application Ser. No. 12/875,880 filed Sep. 3, 2010 and which claims priority to U.S. Provisional Patent Application Ser. No. 61/477,819 filed Apr. 21, 2011. The contents of U.S. patent application Ser. No. 12/875,880, U.S. Provisional Patent Application Ser. No. 61/240,120, U.S. Provisional Patent Application Ser. No. 61/477,819, and PCT/US2011/036164 are incorporated by reference herein in their entireties.

STATEMENT OF GOVERNMENT INTEREST

At least portions of this invention were made using U.S. government funding provided by the National Science Foundation under grant number DMR-0907324 and by the Department of Energy under grant number ER46657. The U.S. government has certain rights in the invention.

TECHNICAL FIELD

The present disclosure relates to capacitors, and specifically to carbon materials that can be used in capacitors.

TECHNICAL BACKGROUND

The increasing demand for electrical energy requires continuous development of improved energy storage technologies. Batteries store and release energy via chemical reactions, but have limited storage capabilities. While batteries can achieve high energy density values, discharge rates are typically limited by the chemical reactions. In contrast, ultracapacitors do not rely on chemical reactions to release energy. As such, ultracapacitors, also referred to as supercapacitors, can be charged and discharged rapidly.

Ultracapacitors, also called supercapacitors or electrochemical capacitors, are a potential solution for meeting the world's electrical energy storage needs. Vastly accelerated adoption of ultracapacitor technology, now mainly based on porous carbons, is currently limited by the low energy storage density and relatively high effective series resistance of these materials.

Ultracapacitors store energy by forming a double layer of electrolyte ions on the surface of conductive electrodes. Ultracapacitors are not limited by the electrochemical charge transfer kinetics of batteries and thus can operate at very high charge and discharge rates, and can have lifetimes of over a million cycles; however, the energy stored in ultracapacitors is currently an order of magnitude lower than batteries. The limited energy storage of ultracapacitors limits their use to those applications that require high cycle life and power density. The energy density of conventional state-of-the-art ultracapacitor devices, mainly based on porous activated carbon (AC), is about 4-5 Wh/Kg while that of lead acid batteries is in the range 26-34 Wh/Kg. A conventional AC material, with a specific surface area (SSA) in the range of 1,000-2,000 m²/g and a pore size distribution in the range of 2-5 nm, can have a gravimetric capacitance of 100-120 F/g in an organic electrolyte. Significant research has thus been focused on increasing energy density without sacrificing cycle life or high power density.

Thus, there is a need to address the problems and other shortcomings associated with existing ultracapacitor technology and carbon materials for use therein. These needs and other needs are satisfied by the compositions and methods of the present disclosure.

SUMMARY

In accordance with the purpose(s) of the invention, as embodied and broadly described herein, this disclosure, in one aspect, relates to capacitors, and specifically to carbon materials that can be used in capacitors.

In one aspect, the present disclosure provides a method for making activated microwave expanded graphite oxide comprising expanding and reducing graphite oxide with microwave radiation to produce MEGO; and chemically activating the MEGO.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

DESCRIPTION

Figure 1:
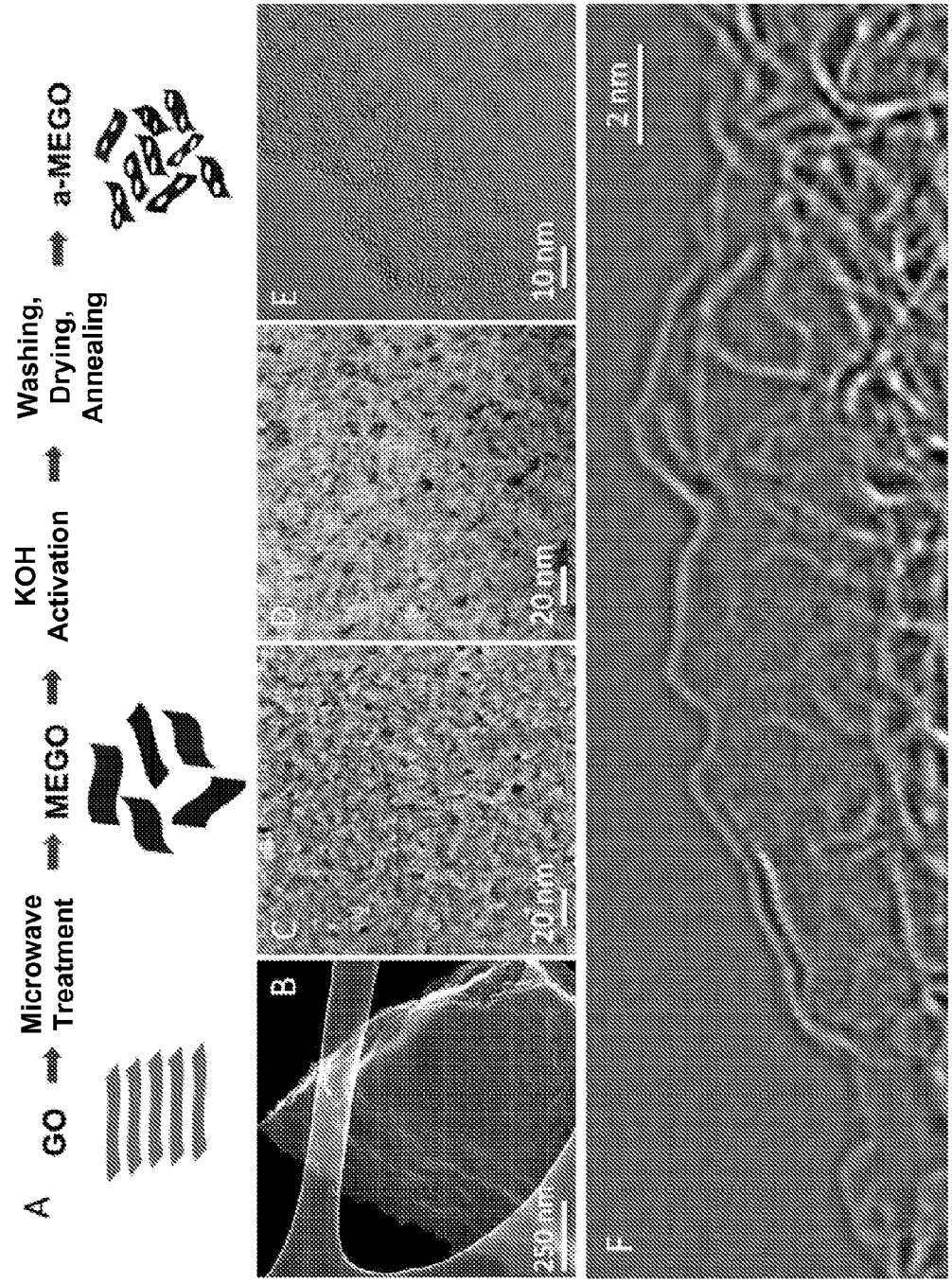
FIG. 1 is a (A) schematic showing the microwave exfoliation/reduction of graphite oxide and the following chemical activation of microwave exfoliated graphite oxide (MEGO) with potassium hydroxide (KOH), (B) low magnification scanning electron microscopy (SEM) image of a 3D activated MEGO (a-MEGO) chunk, (C) high-resolution SEM image of a different sample region of the same chunk, (D) annular dark-field scanning transmission electron microscopy (ADF-STEM) image of the same area depicted in (C), (E) a high magnification phase contrast electron microscopy image of the thin edge of an a-MEGO chunk, taken at 80 kV, and (F) exit wave reconstructed high resolution transmission electron microscopy (HRTEM) image from the edge of a-MEGO.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

DEFINITIONS

As used in the specification and the appended claims, the singular forms "a," "an" and "the" include plural referents unless the context clearly dictates otherwise. Thus, for example, reference to "a solvent" includes mixtures of two or more solvents.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not.

Throughout this specification, unless the context requires otherwise, the word "comprise," or variations such as "comprises" or "comprising," will be understood to imply the inclusion of a stated integer or step or group of integers or steps but not the exclusion of any other integer or step or group of integers or steps.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly discussed above, the present disclosure provides a carbon material that can be used in a capacitor, such as, for example, an ultracapacitor.

Ultracapacitors, also called supercapacitors or electrochemical capacitors, are a potential solution to meeting the world's electrical energy storage needs. Vastly accelerated adoption of ultracapacitor technology, now mainly based on porous carbons, is currently hindered by their low energy storage density and relatively high effective series resistance. The present disclosure provides, in various aspects, a new carbon material obtained through the chemical activation of microwave exfoliated graphite oxide (MEGO). In one aspect, this new type of carbon (hereinafter referred to as activated MEGO, or a-MEGO) has at least one of: a high surface area of up to about 3,100 m$^2$/g or more, a high electrical conductivity, a low O and H content with strong evidence of primarily sp$^2$ bonding, a novel pore structure, or a combination thereof. In another aspect, the carbon material or a portion thereof can be a negative curvature carbon allotrope. In another aspect, two-electrode ultracapacitor cells constructed with a-MEGO electrodes and ionic liquid (IL) electrolytes can yield significantly higher gravimetric capacitance than other conventional electrode materials used with ionic liquid electrolytes, with energy and power densities exceeding those of commercially available ultracapacitors by a factor of at least about 4 and 10, respectively.

Ultracapacitors store energy by forming a double layer of electrolyte ions on the surface of conductive electrodes. Ultracapacitors are not limited by the electrochemical charge transfer kinetics of batteries and thus can operate at very high charge and discharge rates, and can have lifetimes of over a million cycles; however, the energy stored in conventional ultracapacitors can be about an order of magnitude lower than batteries. Such lower energy storage values can limit the adoption of ultracapacitors to applications that require high cycle life and power density. In one aspect, the energy density of conventional ultracapacitor devices, mainly based on porous activated carbon (AC), is about 4-5 Wh/Kg, while that of lead acid batteries is in the range 26-34 Wh/Kg. A conventional AC material with a SSA in the range of 1,000 m$^2$/g to 2,000 m$^2$/g and a pore size distribution in the range of 2 nm to 5 nm, can have a gravimetric capacitance of 100-120 F/g in organic electrolytes. A significant amount of research has been focused on increasing energy density for ultracapacitor materials without sacrificing cycle life or high power density. For example, capacitance increases have been reported in the organic electrolyte tetraethylammonium tetrafluoroborate (TEA BF$_4$) in acetonitrile (AN) using carbide-derived carbons (CDCs) with sub-nanometer pores. The capacitance increases can be attributed to the partial or complete desolvation of ions in the sub-nanometer pores. Metal oxides such as RuO$_2$ or MnO$_2$, MoO$_3$, and electronically conducting polymers or their composites, have also been used to increase specific capacitance via pseudo-capacitive redox reactions. Although capacitances of up to 1,300 F/g (e.g., with MnO$_2$) have been reported in aqueous electrolytes, the low electrical conductance, poor compatibility with organic electrolytes, and short cycle life have limited the practical application of these pseudo-capacitive materials. Carbon nanotubes (CNTs), especially single walled CNTs (SWNTs) have an ideal limit SSA of 1,300 m$^2$/g, and can have high electrical conductance along the tubes and can demonstrate good performance in organic electrolyte; however, the high cost for mass production of high quality SWNTs can be a challenge for the commercialization of SWNT-based ultracapacitors.

Graphene has a theoretical SSA of 2,630 m$^2$/g and a very high intrinsic in-plane electrical conductivity, as well as high mechanical strength and chemical stability. Graphene-based materials derived from graphite oxide (GO) can also be manufactured in industrial quantities at relatively low cost. Graphene can be made using any of a variety of known methods. Specific methods for obtaining chemically-modified graphene are also disclosed in Park and Ruoff, "Chemical methods for the production of graphenes," *Nat. Nanotechnol:* 29 (March, 2009), incorporated herein by reference for the purpose of disclosing graphene synthetic methods. In various aspects, graphene can be produced by reducing graphene oxide with a reducing agent. Example reducing agents include anhydrous hydrazine, hydrazine monohydrate, dimethyl hydrazine, sodium borohydride, hydroquinone, alkaline solutions, and alcohols. Hydrogenation/hydrogen transfer techniques employing small molecule reduced species as hydrogen sources and graphene oxide as the hydrogen sink may also be used. Catalysts, such as tris(tripenylphosphine) rhodium chloride can optionally be used as activators of hydrogen that is produced during oxidation of a hydrogen source.

Ultracapacitors based on reduced graphene oxide with capacitance values of approximately 130 F/g in aqueous KOH or 100 F/g in organic electrolytes have been developed. Other graphene-based materials derived from GO can have high end capacitance values of ~200 F/g in aqueous electrolytes, ~120 F/g in organic electrolytes, and ~75 F/g in an ionic liquids. In addition to these materials, high frequency ultracapacitors prepared from oriented graphene grown on nickel surfaces can provide efficient filtering of 120 Hz current with an RC time constant of less than 0.2 ms, but such performance is at the cost of low effective energy storage due to the very low density of the electrode material.

While much research has been conducted, SSA values for carbon materials derived from GO remain substantially less than 2,630 m$^2$/g. In one aspect, the present disclosure provides an activation method with, for example, KOH, for processing microwave exfoliated graphite oxide (MEGO) and/or thermally exfoliated graphite oxide (TEGO), to achieve SSA values up to about 3,100 m$^2$/g or more. Under the inventive processing conditions, an 'activated MEGO' (a-MEGO) material can be obtained. In one aspect, the inventive a-MEGO is a novel carbon with a unique porous structure, and can yield very high gravimetric capacitance values, low ESR values in commercially available ionic liquid and/or organic electrolytes, or a combination thereof.

In various aspects, the inventive process simultaneously increases the surface area accessible by electrolyte ions while maintaining the high electrical conductivity, resulting in high energy and power density in two-electrode ultracapacitor cells. In another aspect, a new type of highly porous carbon is generated that is not graphene. In yet another aspect, the inventive carbon can be similar in structure to 'negative curvature carbon'.

In various aspects, chemical activation, such as, for example, KOH activation, can provide an a-MEGO material having improved porosity. In another aspect, if used in a supercapacitor, a resulting a-MEGO material can enable the supercapacitor to having enhanced performance as compared to supercapacitors comprising conventional materials.

In one aspect, a MEGO powder can be prepared by exposing GO to microwave energy. In one aspect, the microwave energy can be from about 300 MHz to about 300 GHz. In another aspect, the microwave energy can be from about 1 to about 10 GHz. In a specific aspect, the microwave energy can be about 2.45 GHz. The source of microwave energy can be any source suitable for use in the methods of the present disclosure. In various aspects, a microwave source can comprise a magnetron, klystron, gyrotron, field effect transistor, tunnel diode, Gunn diode, IMPATT diode, or a combination thereof. In a specific aspect, a MEGO powder can be prepared by irradiating GO in a conventional (e.g., domestic) microwave oven. The intensity of the microwave energy can also vary, depending, upon, for example, the specific material and degree of expansion desired. In one aspect, the microwave energy is from about 100 to about 2,500 W, or from about 700 to about 1,500 W. In addition, the length of time for which a material is subjected to microwave irradiation can vary. In one aspect, the intensity of the microwave radiation and/or the length of time for which the material is exposed to the microwave energy is sufficient to at least partially expand the GO powder. In another aspect, the length of time can be at least about 10 seconds, for example, about 10, 20, 30, 40, 50, 60, 80, 100, 200, 300, or more seconds. In a specific aspect, a GO powder can be exposed to microwave radiation of about 2.45 GHz and about 1,100 W for a period of about 1 minute. GO materials be prepared using known methods, and one of skill in the art could readily prepare a suitable GO material for use in the methods of the present disclosure.

Following irradiation, the MEGO powder can be contacted with an activator, after which, the powder can optionally be filtered and dried. In one aspect, the resulting material is a mixture of MEGO and an activator, such as, for example, MEGO/KOH, that can be chemically activated. In another aspect, the mixture of MEGO and activator does not have to be filtered and/or dried, prior to a heat treatment step as described herein.

In one aspect, the activator can comprise a basic material, such as, for example, KOH or an aqueous solution thereof. In another aspect, the activator can comprise a redicing agent. In still other aspects, an activator can comprise one or more other compounds suitable for use in preparing an activated MEGO material. In various aspects, an activator can comprise zinc chloride, aluminium chloride, magnesium chloride, boric acid, nitric acid, phosphoric acid, potassium hydroxide, sodium hydroxide, or a combination thereof.

After contacting MEGO with an activator and optionally filtering and drying, the mixture can be subjected to a heat treatment step. In one aspect, the heat treatment step can comprise exposing the mixture to a flowing stream of an inert and/or a reducing gas at elevated temperature for a period of time. In one aspect, the gas comprises argon. In other aspects, the gas or mixture of gases can comprise other inert and/or reducing gases. In another aspect, the environment (e.g., furnace tube) can be held at a negative pressure for a period of time, for example, about 600 Torr, 500 Torr, 400 Torr, 300 Torr, 200 Torr, 100 Torr, or less. In still other aspects, the temperature of a heat treatment step can vary depending on the degree of activation desired and the specific materials being processed. In one aspect, the temperature is a temperature sufficient to at least partially activate the MEGO material. In another aspect, the temperature can vary if different gases are used. In other aspects, the duration of a heat treatment step can be from about 30 minutes to about 5 hours, for about 0.5, 1, 1.5, 2, 2.5, 3, 3.5, 4, 4.5, or 5 hours. In a specific aspect, a heat treatment step can be from about 1 to about 2 hours. In other aspects, a heat treatment step can be less than about 0.5 hours or greater than about 5 hours, and the present invention is not intended to be limited to any particular length of time for a heat treatment step. One of skill in the art, and in possession of this disclosure, could readily determine appropriate activation conditions for preparation of an a-MEGO material.

In one aspect, the MEGO and/or mixture of MEGO and base (e.g., MEGO/KOH) can be positioned in a tube furnace under, for example, a flowing argon stream at a pressure of about 400 Torr. The mixture can then be heated at about 800° C. for about one hour. FIG. 1A illustrates an exemplary schematic of an activation process, as described herein. While not wishing to be bound by theory, the chemical activation process can occur according to the following reaction scheme:

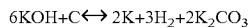

$$6KOH+C \leftrightarrow 2K+3H_2+2K_2CO_3$$

followed by the at least partial decomposition of $K_2CO_3$ and/or reaction of $K/K_2CO_3/CO_2$ with carbon.

In one aspect, phosphoric acid can be used for activation, wherein the acid reacts with the carbon source at temperature less than 450° C., leading to what has described as C—C bond weakening and formation of a cross-linked structure. This likely reduces the release of volatile materials, lowers the activation temperature, and increases the carbon yield.

In another aspect, after activation, at least a portion of the activated MEGO is not graphene. In still another aspect, after activation, the MEGO material is not grapheme, but rather has a unique structure as described herein.

In another aspect, FIG. 1B illustrates the microstructure of an exemplary a-MEGO material, prepared as described herein. Similarly, FIGS. 1C-1F illustrate (C) high resolution SEM, (D) annular dark field scanning transmission electron microscopy (ADF-STEM), and (E-F) high-resolution TEM (HR-TEM) images of the microstructure of the a-MEGO material. It should be noted that different starting materials and reaction conditions can produce a-MEGO materials have varying microstructure. As such, the figures and descriptions herein are intended to be exemplary, but not limiting with respect to the materials and methods of the present disclosure. The images in FIG. 1 illustrate an etched MEGO microstructure with a three-dimensional distribution of mesopores.

In one aspect, chemical activation can generate a plurality of pores in the carbon material. In one aspect, the pore distribution and specific surface area can play significant roles in high gravimetric capacitance values, and the types of surfaces that are present and accessible to the electrolyte are likely critically important to good compatibility with a wide range of electrolytes with different ion sizes, such as the ILs and the organic electrolytes described herein.

Figure 2:
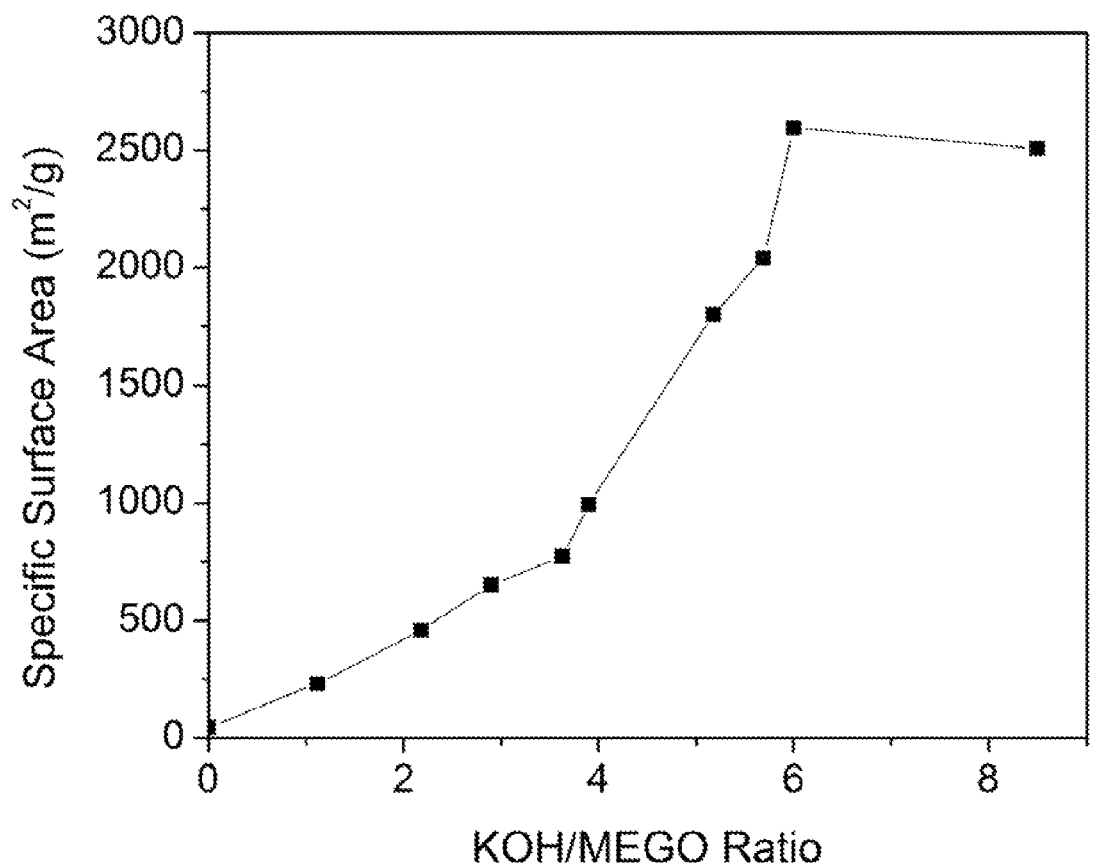
FIG. 2 illustrates the BET specific surface area of a-MEGO versus the KOH to MEGO loading ratio in the mixture before activation.
Figure 3:
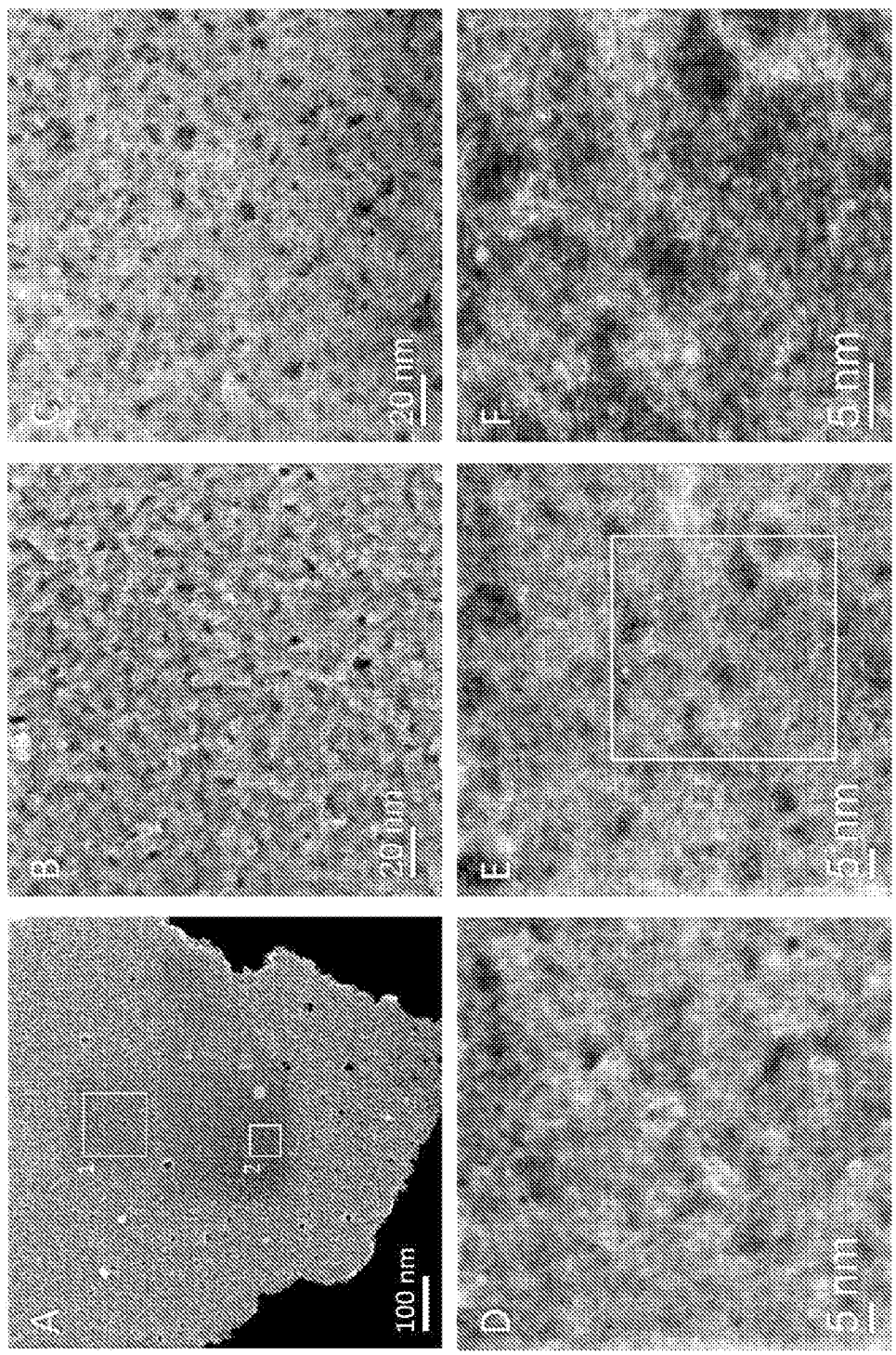
FIG. 3 illustrates (A) low magnification SEM, (B) high magnification SEM, and (C) ADF-STEM images of a-MEGO, where B and C were simultaneously taken from region 1 of (A), showing larger pores of between 2-10 nm; (D) very high magnification SEM and (E) ADF-STEM images simultaneously taken from region 2 of (A), and (F) acquired from the region outlined as a box in (E).

In another aspect, chemical activation can generate a three-dimensional network of pores in the carbon material. In another aspect, all or a portion of the pores generated in the carbon material can comprise mesopores. In another aspect, at least a portion of the pores generated in the carbon material can have a diameter of from less than about 1 nm to about 10 nm. In other aspects, at least a portion of the pores can be smaller than 1 nm or greater than 10 nm, and the present disclosure is not intended to be limited to any particular pore size and/or distribution. In another aspect, the SSA of the resulting material can be controlled by varying the ration of MEGO to base and/or reducing agent. For example, FIG. 2 illustrates exemplary SSA values obtainable by varying the KOH/MEGO ratio.

While not wishing to be bound by theory, chemical activation can, in one aspect, at least partially digest the MEGO material. In another aspect, chemical activation can restructure at least a portion of the MEGO material. It should be noted that statistical quantitation of the resulting pores by electron microscopy techniques can be difficult.

In one aspect, chemical activation can produce an a-MEGO material having a dense pore structure, wherein at least a portion of the walls of the pores comprise curved carbon sheets. In another aspect, at least a portion of these curved carbon wall sheets are a single layer thickness.

In another aspect, an a-MEGO material can be comprised of a plurality of n-membered rings in plane, where n varies between about 5 and about 8. As illustrated in the exit wave reconstructed image of FIG. 1F, the in-plane cystallinity can, in various aspects, be preserved even as the sheets bend through relatively high degrees of curvature.

The chemically activated a-MEGO material can, in one aspect, have a BET surface area of up to about 3,100 m$^2$/g, for example, about 1,000, 1,200, 1,300, 1,500, 1,800, 2,000, 2,200, 2,400, 2,600, 2,800, 3,000, 3,100 m$^2$/g, or more.

In another aspect, the chemically activated a-MEGO can exhibit a high electrical conductivity, such as, for example, up to about 500 S/m or more. In various aspects, an a-MEGO material can have a powder electrical conductivity of about 200, 250, 300, 350, 400, 450, 500, 550 S/m, or more. In yet another aspect, the chemically activated a-MEGO can exhibit a low oxygen content, a low hydrogen content, or a combination thereof. In various specific aspects, an a-MEGO material can have a C/O atomic ratio of up to about 35, for example, about 20, 24, 26, 28, 30, 32, 34, 35, or greater. In another aspect, an a-MEGO material can have a hydrogen content less than about 0.5 wt. % or less than about 0.3 wt. %. In another aspect, an a-MEGO material can have a hydrogen content less than the threshold detection limit by elemental analysis.

In yet another aspect, at least a portion of a chemically activated a-MEGO material comprises sp$^2$ carbon.

Figure 4:
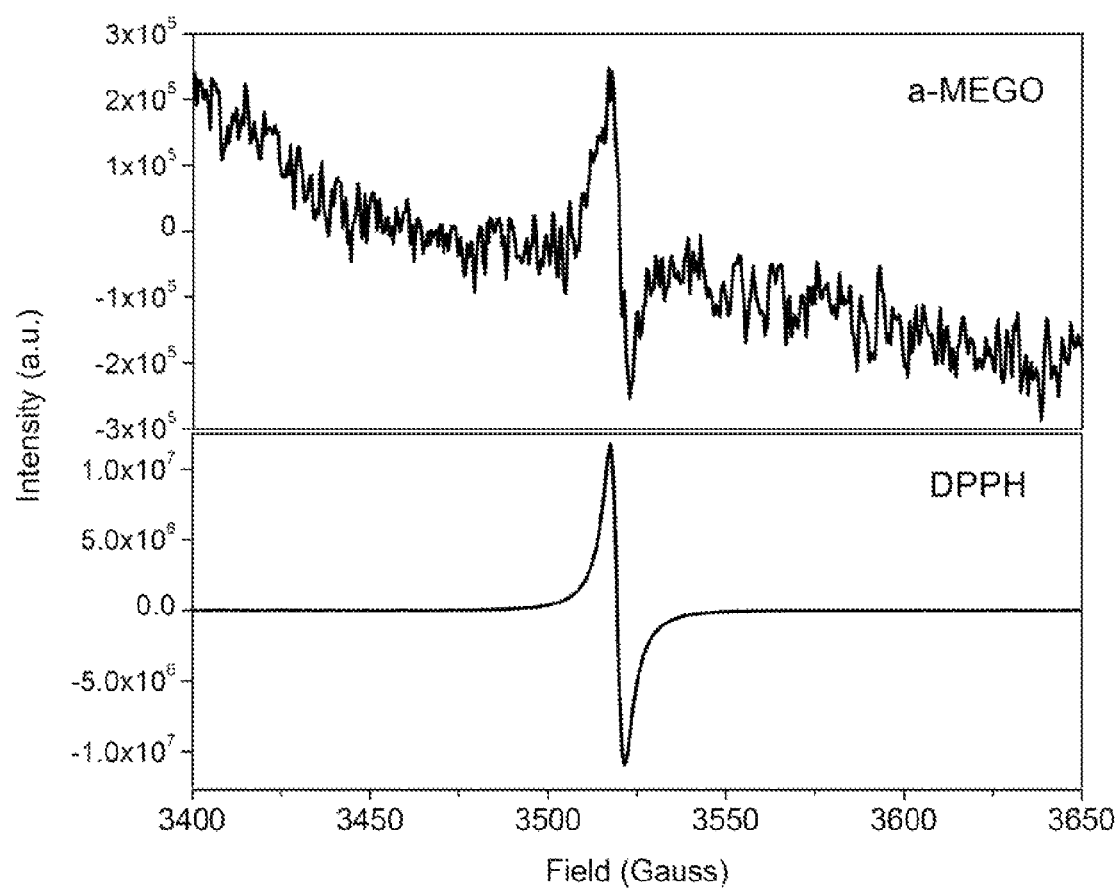
FIG. 4 illustrates electron paramagnetic resonance (EPR) data of a-MEGO having a SSA of about 2,520 m²/g, with DPPH used as a standard.

In still other aspects, at least a portion of an a-MEGO material can comprise a low, for example, ppm level, unpaired spin count as determined by electron paramagnetic resonance (EPR), as illustrated in FIG. 4. When combined with the low concentration of oxygen and hydrogen atoms, the EPR data indicates that a-MEGO materials have a small fraction of edge atoms.

Figure 5:
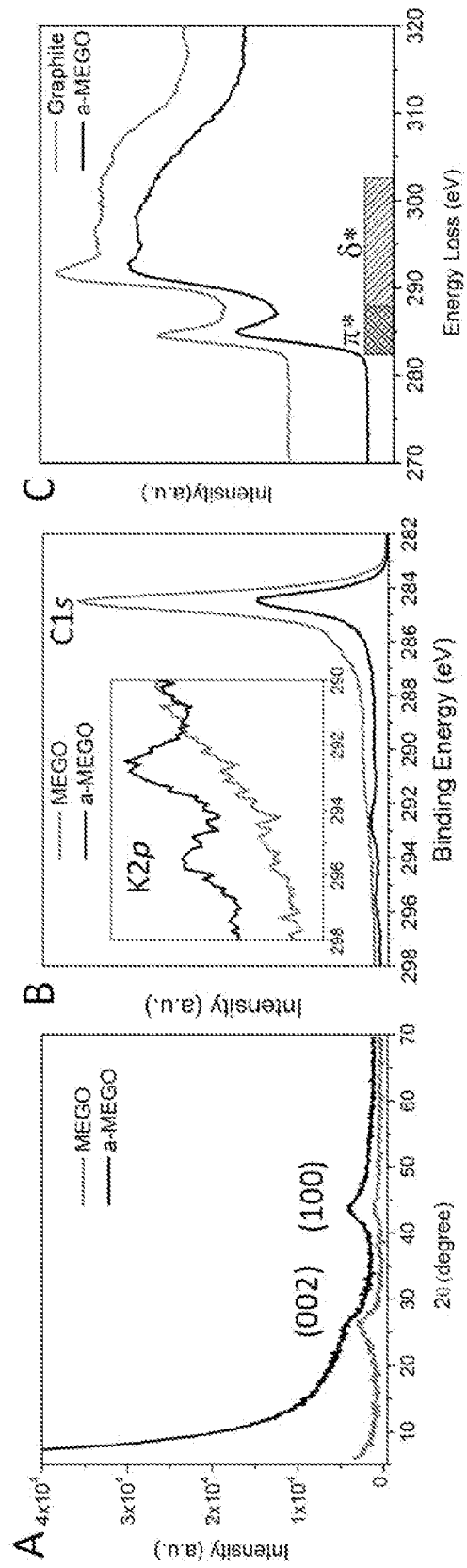
FIG. 5 illustrates (A) synchrotron powder X-ray diffraction (XRD) data of a sample of a-MEGO material having a specific surface area (SSA) of about 2,520 m²/g, plotted as Cu Kα, (B) X-ray photoelectron spectroscopy (XPS) of the C 1s region and the K 2p region (inset), and (C) electron energy loss spectroscopy (EELS) data for a-MEGO and graphite.

As noted briefly above, a-MEGO prepared in accordance with the methods described herein can, in one aspect, be comprised primarily of single carbon sheets. Other analyses of a-MEGO materials, such as synchrotron powder X-ray diffraction (XRD; FIG. 5A) and X-ray photoelectron spectroscopy (FIG. 5B) are consistent with images obtained via HR-TEM, indicating predominately single carbon sheets. Specifically, the XRD and XPS studies show a reduced intensity for the (002) peak. The low-angle scatter observed for a-MEGO materials as compared to MEGO (not activated) is also consistent with the presence of a high density of pores in the a-MEGO material. The C1s region of the XPS spectrum (FIG. 5B) for a MEGO material illustrates a tail between about 286 eV and about 290 eV that, in one aspect, can be attributed to C—O groups and energy loss shake-up features. In the activated material (a-MEGO), the presence of such oxygen containing groups was suppressed, with two new peaks appearing between about 292 eV and about 296 eV. These new peaks can be attributed to potassium residue, primarily as $K_2CO_3$ with a small amount of KOH. Thus, if other bases and/or reducing agents, other than KOH, are used, the resulting XPS spectra will vary.

In one aspect, quantification of the amount of sp$^2$-bonding can be determined by measuring the ratio between $\pi^*$ bonding and $\pi^*+\delta^*$ bonding using, for example, electron energy loss spectroscopy (EELS). FIG. 5C illustrates a comparison of the carbon K near edge structure for both a-MEGO and graphite samples of equivalent thickness. Assuming 100% sp$^2$ bonding in the graphite reference spectra, the a-MEGO sample can have about 98% (±2%) sp$^2$ bonding. Complementary measurements can also be made by XPS (FIG. 6), providing similar results. In addition, micro Raman spectroscopy (FIG. 7A) and Fourier transform infrared spectroscopy (FIG. 7B) techniques can be utilized to reinforce and understand the specific structure of a particular a-MEGO material.

Figure 8:
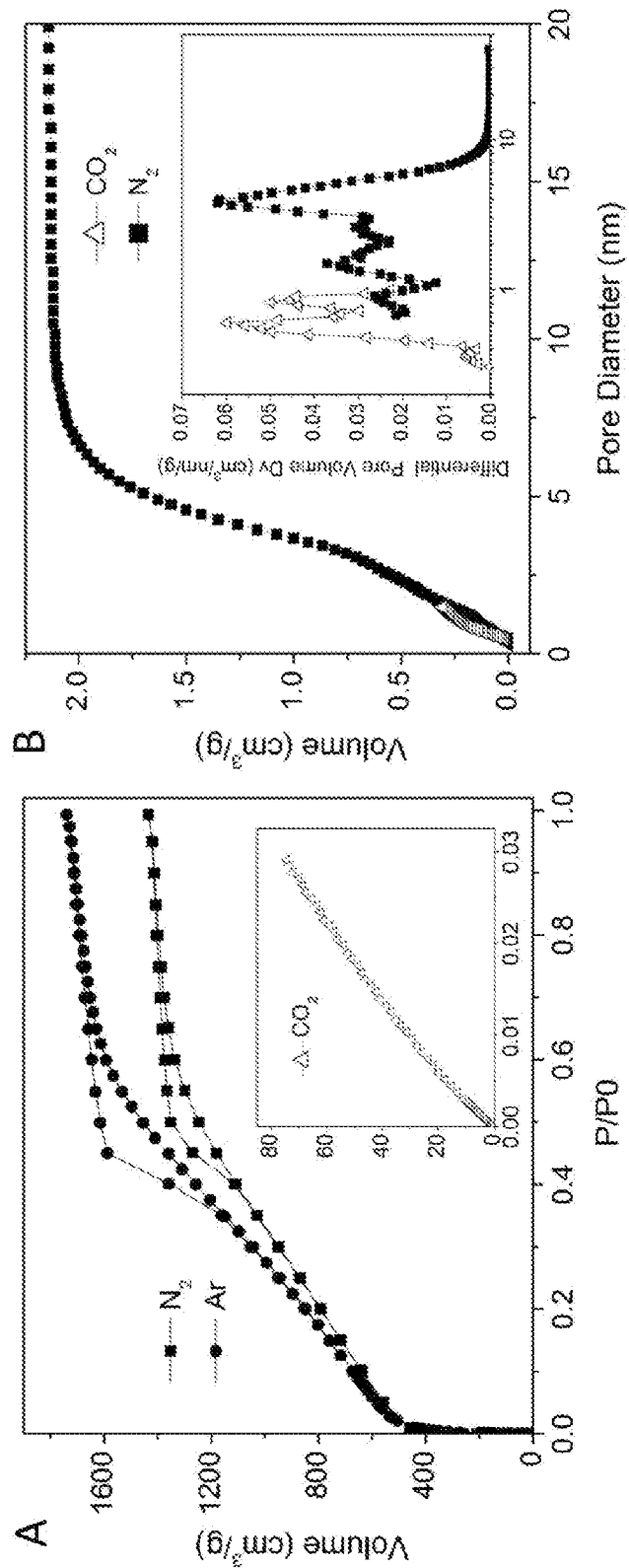
FIG. 8 illustrates (A) high resolution, low pressure $N_2$ (77.4 K) and Ar (87.3 K) isotherms, together with the $CO_2$ (273.2 K) isotherm (inset), and (B) cumulative pore volume and pore size distribution (inset) for $N_2$, calculated using a slit/cylindrical NLDFT model, and $CO_2$, calculated using a slit pore NLDFT model, both from gas adsorption/desorption analysis of an a-MEGO sample having a SSA of about 3,100 m$^2$/g.
Figure 9:
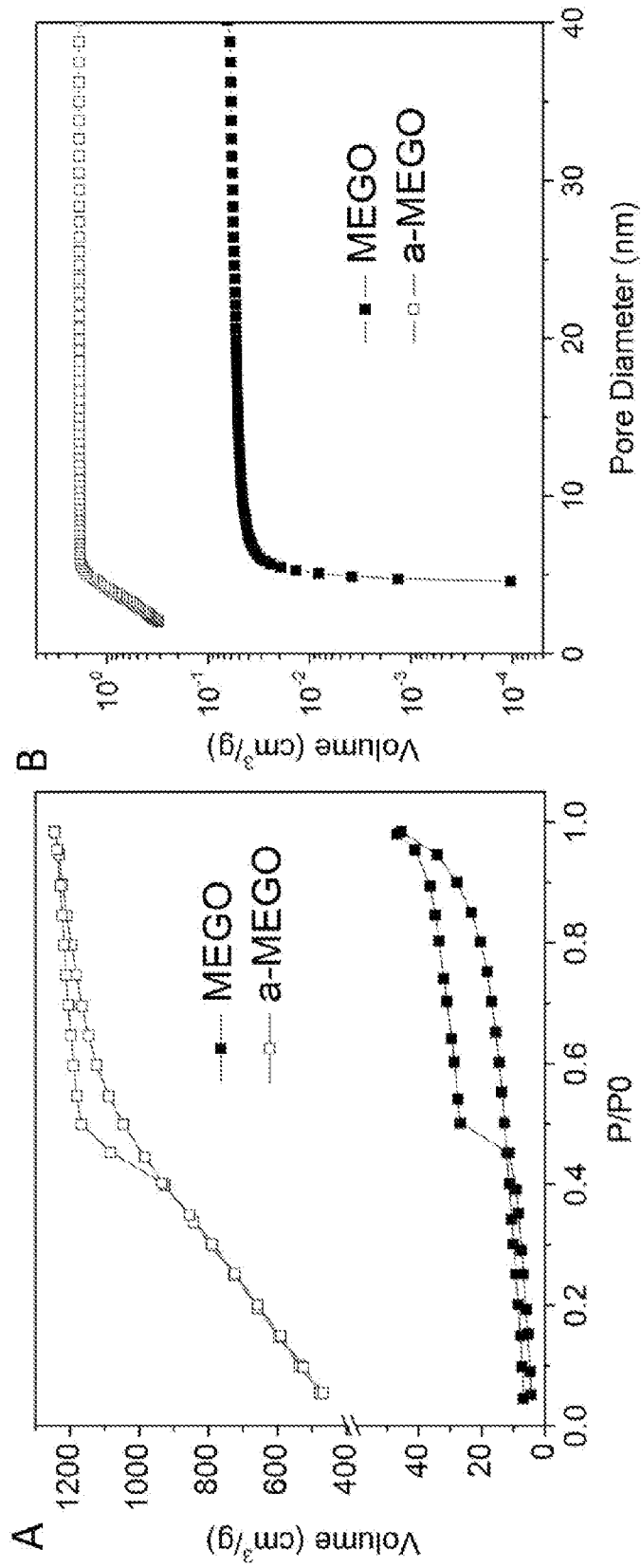
FIG. 9 illustrates (A) $N_2$ (77.4 K) isotherms, and (B) cumulative pore volume versus pore diameter obtained from (A) obtained during adsorption/desorption analysis of an a-MEGO sample having an SSA of about 2,520 m$^2$/g and using a MEGO control sample.

As noted above, MEGO materials can exhibit a distribution of pores after chemical activation. In one aspect, adsorption experiments can be performed to characterize the surface and pore size distribution of a MEGO material after chemical activation. FIG. 8 illustrates data obtained from coupling nitrogen (77.4 K) and argon (87.3 K) adsorption/desorption experiments with advanced methods based on density functional theory, together with $CO_2$ (273.2 K) adsorption experiments employed to assess ultramicropores (i.e., pores having a width of less than about 1 nm). The isotherms from these experiments can reveal details of the low-pressure region where micropore filling occurs, as well as pore condensation and type H2 hysteresis. In one aspect, the experimental data from a-MEGO samples indicates an interconnected pore system with constrictions. In contrast, FIG. 9 illustrates data obtained from similar analysis of a MEGO (unactivated) control sample), indicating a significantly smaller pore volume than that obtained for the a-MEGO material. In one aspect, and while not wishing to be bound by theory, the smaller pore volume can be attributed to the platelet like structure in MEGO materials, whereas the pores in a-MEGO materials can exhibit a well-defined micro-mesopore size distribution as in FIG. 8B, with a significant increase in pore volume of up to about 2.14 cm$^3$/g relative to MEGO materials.

Figure 10:
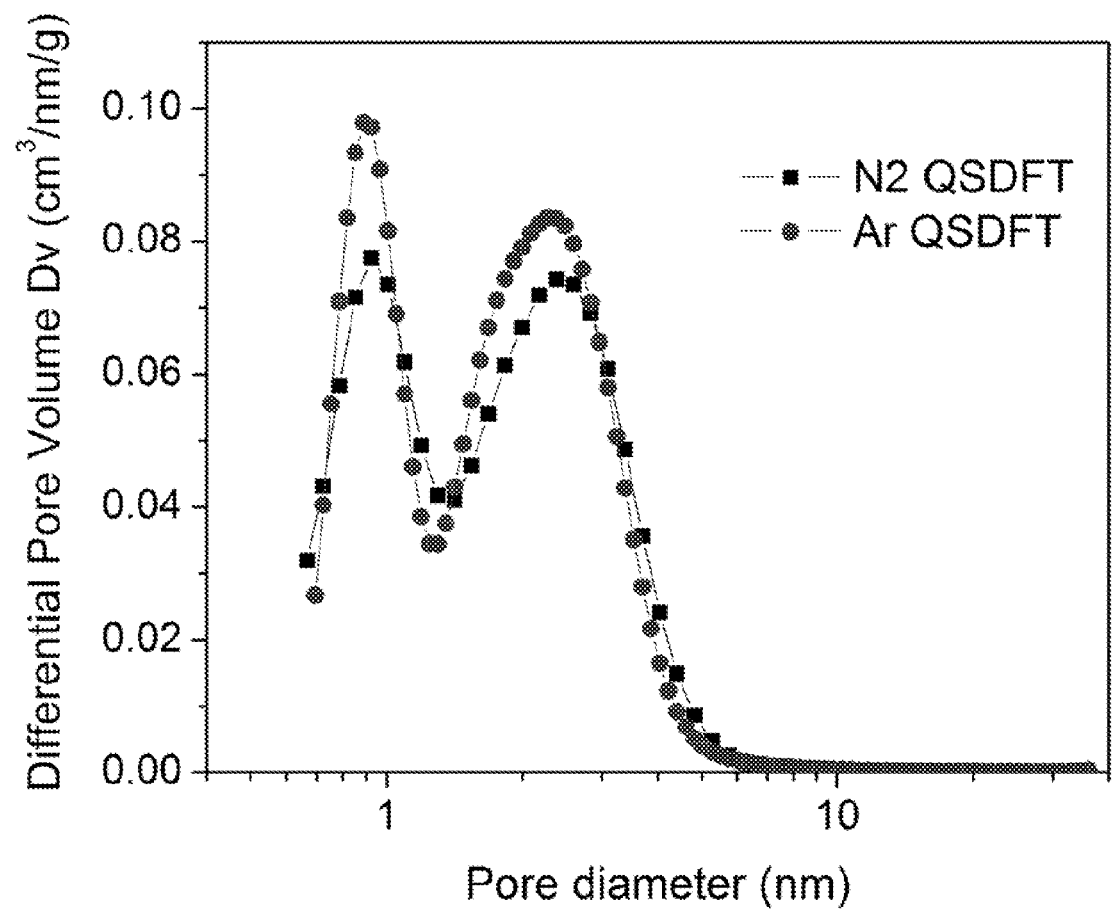
FIG. 10 illustrates the quenched solid density functional theory (QSDFT) pore size distribution of an a-MEGO sample.

In one aspect, the obtained pore size/volume distribution indicates that a-MEGO is a unique material because of the existence of well-defined micro- and mesopores. In another aspect, a-MEGO can exhibit micropores having a width of about 1 nm, as well as narrow mesopores with an average width of about 4 nm. FIG. 10 further illustrates the pore size distribution of an exemplary a-MEGO material, calculated using a quenched solid density functional theory (QSDFT) which can account for surface roughness of the material.

Use of a-MEGO in Electrodes and Supercapacitors

In various aspects, the inventive a-MEGO material can be utilized as a component of an electrode, for example, in a supercapacitor. Supercapacitor designs and electrode designs for use in supercapacitors are known, and one of skill in the art could readily select an appropriate supercapacitor, electrode, and/or cell design for use with the compositions and methods of the present invention. In a supercapacitor, a voltage potential can be applied across the electrodes of the supercapacitor, such that one electrode becomes positively charged and the other becomes negatively charged. Negatively charged ions in the electrolyte cover the surfaces of the positively charged electrode, while positively charged ions in the electrolyte cover the surfaces of the negatively charged electrode, a result of the aforementioned electrostatic interactions.

In one aspect, a supercapacitor comprises one or more graphene-based electrodes, an electrolyte, and a dielectric separator that can divide the supercapacitor into two chambers, wherein each of the two chambers comprises an electrode and a portion of electrolyte. In another aspect, the electrolyte is an ionic liquid and/or comprises an ionic liquid.

Electrolyte

Ionic liquids are typically salts that melt at temperatures below 100° C. They are typically composed of discrete ions or loosely associated ions, each of which offers a unique set of materials properties. These properties can be unavailable from neutral organic compounds, crystalline inorganic salts, or common solvents, such as water. Ionic liquids can exhibit suitable aspects of one or more of the following properties: high conductivity, high chemical stability, high thermal stability, or high electrochemical stability, large electrochemical window, low melting point, low viscosity, low vapor pressure and volatility, high environmental stability, low toxicity, low cost, ease of scalability and purification. In various aspects, an ionic liquid can be used at high potentials, such as, for example, 2.0 V or higher.

In one aspect, the melting point of an ionic liquid can be decreased by using liquids with lower anion/cation interactions or with more diffuse charge structures. Melting points can also be decreased by, for example, using asymmetric ionic liquids as well as by introducing various types of synthetic oligomers or polymers as pendant functionalities.

In another aspect, the viscosity of an ionic liquid can be decreased by the presence of perfluorinated anions and oligomer or polymer substituents. Linked moieties possessing multiple charged components can also lower viscosity while simultaneously increasing thermal stability.

In yet another aspect, the electrochemical window of ionic liquids can be broadened by adding fluorinated alkyl chains to the cation. In some aspects, this can cause dramatic differences in the local electronic environments. The anions can be fluorinated anions, such as, for example, bistriflimide, or a dicyanamide anion.

In still another aspect, the thermal stability of an ionic liquid can be increased by linking multiple charged groups together or through the use of fluorinated components. Reactivity as a function of temperature can also be used to select ionic liquids that are more thermally stable at ultracapacitor operation and/or storage temperatures.

In one aspect, any suitable ionic liquid based electrolyte can be used in conjunction with one or more electrodes in an electrochemical cell. In various aspects, these can comprise ionic liquids with ammonium cations, imidazolium cations, or a combination thereof. In a specific aspect, these cations can be paired with tetrafluoroborate or bis(trifluoromethanesulfonyl)imide anions.

In another aspect, an ionic liquid can comprise a cyclic ammonium- or phosphonium-based composition. In a specific aspect, an ionic liquid can comprise a spirocyclic ammonium- or phosphonium-based composition. In yet another aspect, an ionic liquid can comprise a N-methyl-N-alkyl pyrrolidinium bistriflimide. In various aspects, an ionic liquid can comprise pyrrolidinium salts as cations, wherein the inclusion of a longer alkyl chain can decrease the melting point of the ionic liquid. In an exemplary aspect, an octyl-functionalized cation can have a melting point of about −15.2° C. In another aspect, a cation/anion combination with a desired melting point can be selected by one of skill in the art. In other aspects, an ionic liquid can be a pyrrolidinium-based ionic liquid having a melting point lower than about −10° C., a non-pyrrolidinium-based cyclic ammonium, a phosphonium-based cyclic ammonium, or a combination thereof. In a specific aspect, an ionic liquid can comprise an N-methyl-N-alkyl pyrrolidinium bistriflimide ionic liquid having a melting point of about −10° C. or lower. In other aspects, an ionic liquid can be a spirocyclic ammonium- or phosphonium-based ionic liquid. In still other aspects, an ionic liquid can comprise an acyclic ammonium- or phosphonium-based ionic liquid. In still other aspects, an ionic liquid can comprise a combination of one or more ionic liquids recited herein or otherwise known in the art.

In various aspects, an ionic liquid can comprise 1-Butyl-3-methyl-imidazolium tetrafluoroborate, BMIM $BF_4$, 1-Ethyl-3-methylimidazolium bis(trifluoromethylsulfonyl)imide, EMIM TFSI, or a combination thereof. In other aspects, an ionic liquid can comprise one or more ionic liquids not specifically recited herein, and the present invention is not intended to be limited to any particular ionic liquid. In other aspects, the ionic liquid is a mixture of two or more ionic liquids, and/or a mixture of an ionic liquid and another non-ionic electrolyte. In one aspect, an organic electrolyte can comprise TEA $BF_4$ in AN electrolyte. In still other aspects, an organic electrolyte can comprise other species or mixtures of species not recited herein.

In a specific aspect, an ammonium-based ionic liquid comprising N,N-diethyl-N-methyl-N-(2-methoxyethyl)ammonium bis(trifluoromethanesulfonyl) amide can be used. This composition is non-flammable, operates in a wide potential window (5.4 V) and has a high ionic conductivity (4.0 mS/cm at 30° C.). In still other aspects, an ionic liquid or mixture of ionic liquids can exhibit high electrochemical stability, such as, for example, that or quarternary ammonium salts and/or pyrrolidinium salts. In one aspect, an ionic liquid can comprise from about 1 wt. % to about 100 wt. % of an electrolyte, for example, about 1, 2, 3, 4, 5, 7, 9, 12, 14, 16, 18, 20, 22, 24, 26, 28, 30, 34, 36, 38, 40, 45, 50, 55, 60, 65, 70, 75, 80, 85, 90, 95, 96, 97, 98, 99, or 100%. In other aspects, an electrolyte can comprise a solvent, such as, for example, acetonitrile, benzonitrile, and/or other low boiling nitriles, propylene carbonate, ethylene carbonate, dimethyl carbonate, and combinations thereof. In still other aspects, an electrolyte can comprise other solvents and/or mixtures of solvents not specifically recited herein. For example, mixtures of ionic liquids can exploit the unique solvent properties of individual ionic liquids for dissolution of neutral additives.

In other aspects, an electrolyte can comprise a lithium containing electrolyte, such as, for example, $LiBF_4$/AN, $LiPF_6$/EC/DEC, Li-TFSI, $Li_2SO4$, LiOH, or a combination thereof. In a specific aspect, an electrolyte can comprise Li-TFSI dissolved in an ionic liquid, such as, for example, EMIM-TFSI. In still other aspects, an electrolyte can comprise a mixture of any of the ionic liquids, non-ionic liquids, and/or lithium containing electrolytes described herein, optionally with other electrolyte components known in the art. In another aspect, an electrolyte can comprise $H_2SO_4$.

In other aspects, an electrolyte can comprise an ionic liquid or mixture of ionic liquids and another, non-ionic liquid, such as an exogenous solvent. In such an aspect, the other liquid can be present in various amounts and can help render the viscosity or melting point of the electrolyte as a whole suitable for a particular ultracapacitor. For example, 10 wt % acetonitrile can be used in an electrolyte when a triflate ionic liquid is used, as triflate containing ionic liquids can be tacky solids at room temperature. While acetonitrile can have a deleterious effect of dilution in an ionic liquid, it can significantly decrease the viscosity and melting point of the mixture as compared to ionic liquid alone. In various aspects, the melting point of a mixture can be decreased to nearly that of the solvent alone (e.g., −45° C.). In such an aspect, a decreased melting point and increased electrolyte viscosity can improve the ultracapacitor performance as a whole because it can facilitate greater ion mobility, allowing faster and more efficient charging and discharging.

In yet other aspects, an ionic liquid can be anhydrous or substantially anhydrous before it is disposed in an supercapacitor, after it is assembled into the supercapacitor, or both. In aspects where the ionic liquid is anhydrous after assembly into the supercapacitor, any residual water content of materials used in the electrodes can be sufficiently low to preserve the anhydrous or substantially anhydrous state of the ionic liquid. In one aspect, an anhydrous ionic liquid can have a water content of less than about 10 ppm, for example, less than about 10, 9, 8, 7, 6, 5, 4, 3, 2, or 1 ppm. In other aspects, an anhydrous liquid can have a sufficiently low concentration of water so as to avoid detectable hydrolysis products in a supercapacitor during the life of the supercapacitor.

Electrodes

In one aspect, at least one electrode of a cell comprises a graphene-based material, such as, for example, a-MEGO, that is compatible with the electrolyte. In another aspect, any one or more other other electrodes can comprise any suitable material that is compatible with the electrolyte. In one aspect, one or more of the electrodes can be optimized to provide large surface area and compact or small charge separation so as to improve the energy density of the supercapacitor. In one aspect, one of electrodes is not graphene-based and can comprise a different carbon electrode material, such as, for example, activated carbon.

In a specific aspect, one or more electrodes can be made of chemically-modified graphene or a graphene that has been expanded by exposure to microwave radiation followed by chemical activation as described herein. Chemically-modified graphene can demonstrate one or more of the following improvements as compared to activated carbon electrodes: ability to be synthesized with different methods into various morphologies and chemical functionalities, very high surface area to allow large potential gains and high energy density, compatibility with high voltage electrolytes, suitable conductivity without additives, low equivalent series resistance in ultracapacitors allowing improved energy efficiency and less resistive heating during high current loads, improved resistance to deleterious effects of water, and elimination of water and hydrolysis products. In other aspects, an electrode can comprise a carbon composition such as that described in U.S. Provisional Patent Application 61/144,898, PCT Publication No. PCT/US2009/041768, U.S. patent application Ser. No. 12/430,240, U.S. patent application Ser. No. 11/976,574, PCT Publication No. PCT/US2004/032585, and/or U.S. patent application Ser. No. 10/574,507, each of which is hereby incorporated by reference for the purpose of disclosing carbon compositions suitable for use in an electrode.

In another aspect, at least one electrode comprises a-MEGO which was produced by by exposing a graphite-oxide derived carbon to microwave radiation and subsequently chemically activating the carbon to further reduce it, for example using 1-10 M KOH at a temperature of from about 200° C. to about 1,000° C. for several hours. Such an electrode can, in various aspects, be used in conjunction with electrolytes containing propylene-carbonate or acetonitrile or ionic-liquids discussed later or a combination thereof.

Figure 11:
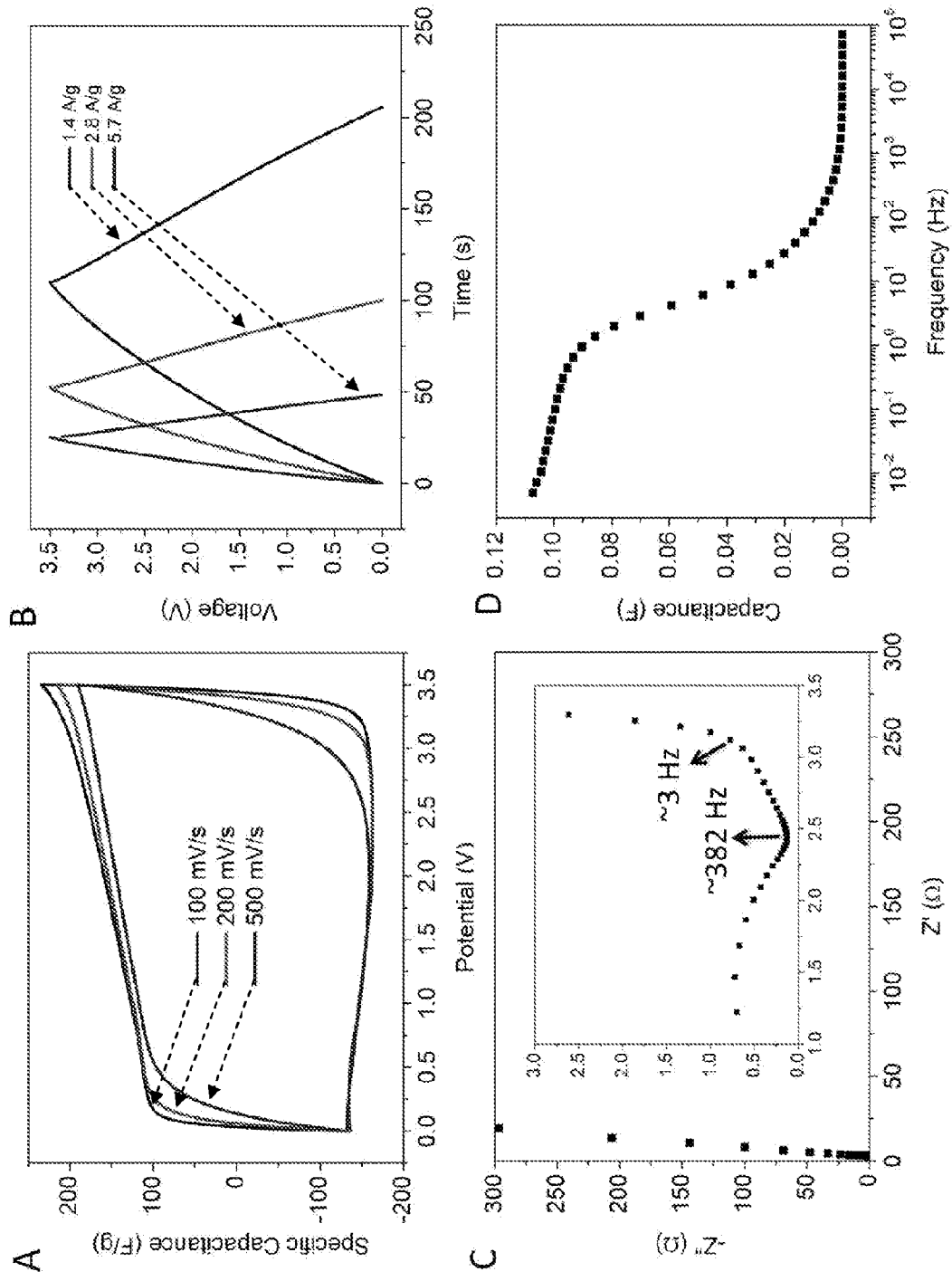
FIG. 11 illustrates (A) cyclic voltammetry (CV) curves for various scan rates of an a-MEGO material having a SSA of about 2,400 m$^2$/g in a BMIM $BF_4$/AN electrolyte, (B) galvanostatic charge/discharge curves under differing constant currents, (C) Nyquist plot, illustrating the imaginary and real components of the impedance, with high frequency inset, and (D) frequency response of the gravimetric capacitance of an a-MEGO supercapacitor.

In one aspect, an a-MEGO material having a SSA of about 1,280 m$^2$/g can exhibit a capacitance of about 122 F/g, when used in a BMIM BF$_4$/AN electrolyte. In an exemplary aspect to evaluate the performance of a-MEGO materials in electrodes, two-electrode symmetrical supercapacitor cells were constructed based on an a-MEGO material having a SSA of about 2,400 m$^2$/g and BMIM BF$_4$/AN electrolyte. FIG. 11A illustrates cyclic voltammetry analysis of the cells, showing rectangular curves from 0 V to 3.5 V over a wide range of scan rates. Similarly, FIG. 11B illustrates galvanostatic charge/discharge curves with specific capacitance values of 165 F/g (at 1.4 A/g), 166 F/g (at 2.8 A/g), and 166/g (at 5.7 A/g). When expressed in volumetric terms, the exemplary a-MEGO samples had a capacitance of about 60 F/cm$^3$. Moreover, at the initiation of discharge, the a-MEGO sample exhibited a voltage drop of 0.034 V ($i_0$ of 1.4 A/g), indicating a very low ESR in the test cell. In another aspect, analysis of the frequency response over the range from 500 kHz to 5 mHz produced the Nyquist plot shown in FIG. 11C. The plot features a vertical curve, indicating a nearly ideal capacitive behavior of the cell.

In further analysis of the a-MEGO sample, the voltage drop at the beginning of discharge curves was used to estimate the internal resistance, wherein an ESR of 3.2Ω was obtained from a-MEGO in BMIM BF$_4$/AN electrolyte. Based on a series RC model, the capacitance from the frequency response data as a function of frequency is shown in FIG. 11D.

Figure 12:
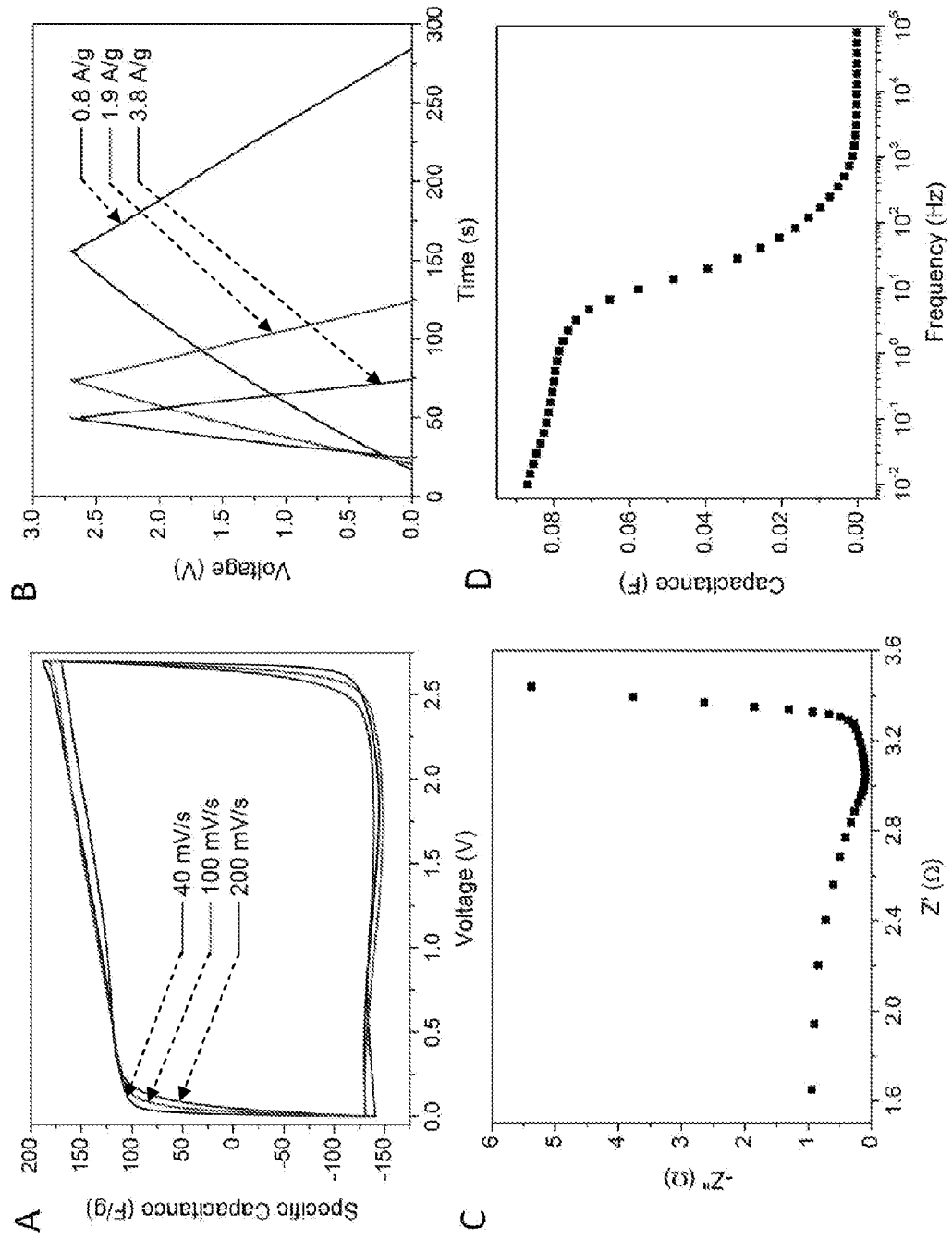
FIG. 12 illustrates (A) cyclic voltammetry (CV) curves for various scan rates of an a-MEGO material having a SSA of about 3,100 m$^2$/g in a 1.0 M TEA $BF_4$/AN electrolyte, (B) galvanostatic charge/discharge curves under differing constant currents, (C) Nyquist plot, illustrating the imaginary and real components of the impedance, and (D) frequency response of the gravimetric capacitance of an a-MEGO supercapacitor.

In one aspect, capacitance of the a-MEGO in BMIM BF$_4$/AN electrolyte can decrease sharply at about 4 Hz and remains at about 0.035 F at 10 Hz. Performance of the same a-MEGO material in TEA BF$_4$/AN electrolyte was evaluated, where a specific capacitance greater than 150 F/g was obtained from a discharge curve with a constant 0.8 A/g current and an ESR or 4.62Ω (FIG. 12). In one aspect, the inventive a-MEGO material can exhibit the highest gravimetric capacitance known to date in an organic electrolyte for any carbon derived from graphene-based materials. In another aspect, energy and power density can be estimated based on measurements of the supercapacitor test cell in BMIM BF$_4$/AN electrolyte. Using the specific capacitance value of 166 F/g (from the discharge curve with a constant current of 5.7 A/g) and a working voltage of 3.5 V, the energy density of an a-MEGO material can be about 70 Wh/kg. In other aspects, the energy density of an a-MEGO material can be at least about 60, at least about 70, at least about 75, at least about 80 Wh/kg, or more.

In another aspect, the methods of the present disclosure can provide an a-MEGO material having a density of at least about 0.2 g/cc, at least about 0.4 g/cc, at least about 0.6 g/cc, at least about 0.8 g/cc, or at least about 1 g/cc. In one aspect, an a-MEGO material can have a density of about 0.2 g/cc. In another aspect, an a-MEGO material can have a density of about 0.6 g/cc. In such an aspect, the a-MEGO material can exhibit a volumetric capacitance of at least about 100 F/cc (i.e., about 166 F/g), or at least about 120 F/cc (i.e., about 200 F/g). In yet another aspect, an a-MEGO material can have a density of about 1 g/cc. In this aspect, the a-MEGO material can have a volumetric capacitance of at least about 200 F/cc. In other aspects, the a-MEGO material can exhibit an energy density of about 85 kW/kg (normalized with carbon), representing a volumetric density of about 51 kW/L for a material having a density of about 0.6 g/cc and about 85 kW/L for a material having a density of about 1 g/cc.

In a further aspect, a practical energy density of greater than about 20 Wh/kg can be achieved for a packaged supercapacitor device, based on a weight ratio of 30% for the active electrode material in the device. This is 4 times higher than existing AC-based supercapacitors, 2 times higher than that reported for carbon-oxide hybrid electrochemical devices, and nearly equal to the energy density of lead acid batteries.

At the same current density (5.7 A/g), the power density can be about 250 kW/kg, as estimated by using the voltage drop and ESR obtained from the discharge curve. For a packaged cell, the power density of ~75 kW/kg is one order higher than the values from commercial carbon supercapacitors that have energy density values of 4-5 Wh/kg. In other aspects, an a-MEGO material, in an electrochemical cell, can exhibit a power density of at least about 200, at least about 225, at least about 250, at least about 275, at least about 300 kW/kg, or more.

This material is also very stable. After 10,000 constant current charge/discharge cycles at a current density of 2.5 A/g in neat BMIM $BF_4$ electrolyte (FIG. 13), 97% of its capacitance was retained.

Figure 14:
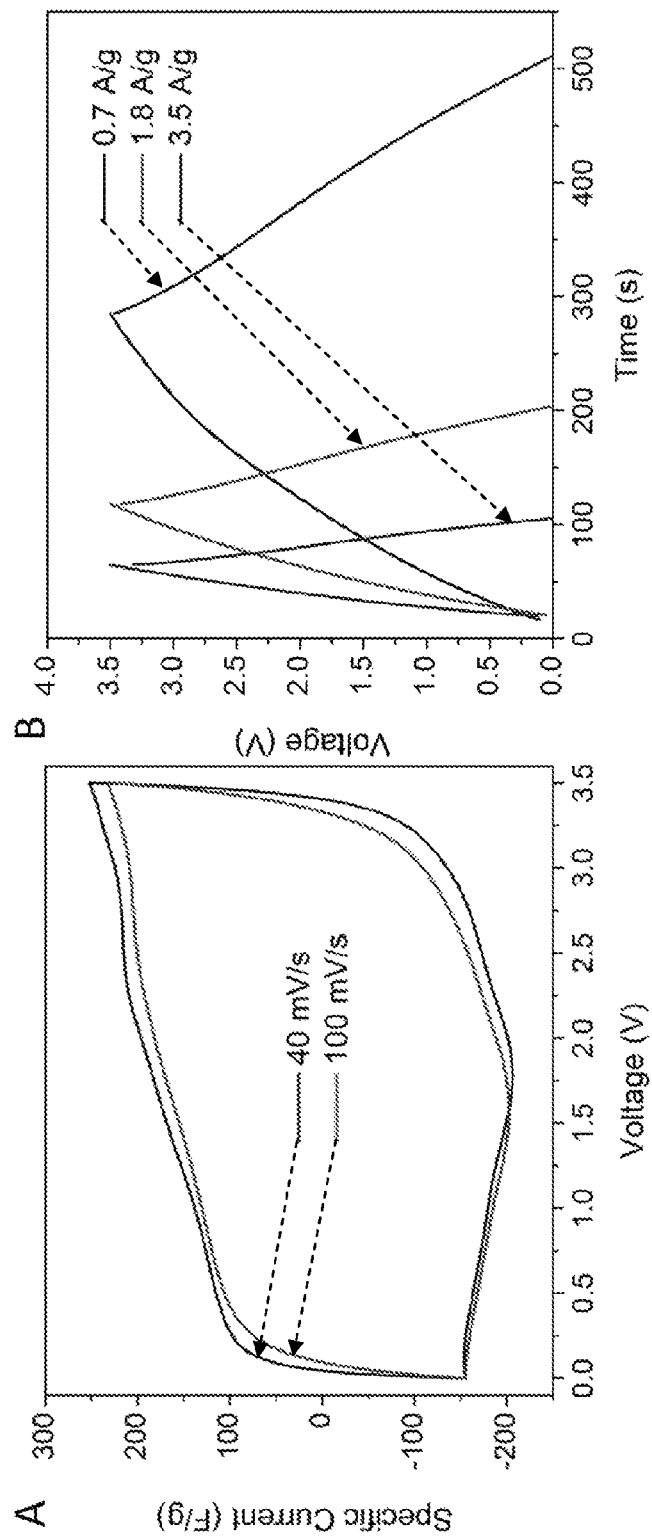
FIG. 14 illustrates (A) cyclic voltammetry (CV) curves for various scan rates of an a-MEGO material having a SSA of about 3,100 m$^2$/g in neat EMIM TFSI electrolyte, and (B) galvanostatic charge/discharge curves under differing constant currents.

In one aspect, the performance of a-MEGO can be higher when used with small diameter ions. For example, when used with EMIM TFSI electrolyte (FIG. 14), the measured gravimetric capacitance of a-MEGO (SSA ~3100 $m^2$/g) at 3.5 V and a current density of 0.7 A/g is 200 F/g, with an ESR of 8.6Ω. However, the curves in FIG. 14 are not as ideal as those from a-MEGO in either BMIM $BF_4$/AN or TEA $BF_4$/AN electrolyte.

In one aspect, the two-electrode supercapacitor cells constructed with a-MEGO electrodes showed a higher gravimetric capacitance in AN-based electrolytes than any other carbon derived from graphene-based materials.

In one aspect, the energy density for an ionic liquid based fully packaged cell, for example, 1-Ethyl-3-methylimidazolium bis(trifluoromethylsulfonyl)imide (EMIM TFSI), can be about 25.5 Wh/Kg, or about the same as that of a conventional lead acid battery. In another aspect, the processes used to synthesize the inventive carbon material are readily scalable to industrial levels.

The superior performance obtained for various electrolytes opens the possibility to engineer supercapacitor electrodes based on a-MEGO materials to target a wide range of applications such as high energy, high power, or low cost. Unlike other carbons, no special substrates or transfer procedures are required for synthesis of the a-MEGO materials. In one aspect, electrodes can be the same thickness used in commercial cells and testing can be performed using commercial collectors, separators, binders, and electrolytes. In addition, the methods to prepare a-MEGO materials can be easily scaled to industrial levels. For example, the inventive methods described herein can be applied to TEGO (FIGS. 15 and 16), which is currently manufactured in ton quantities.

In other aspects, the a-MEGO material can be stable, for example, when used in an electrochemical cell and/or a supercapacitor. In various aspects, the a-MEGO material can be stable for a number of charge/discharge cycles, for example, up to about 200,000, 500,000, or 1,000,000 cycles. In other aspects, the a-MEGO can be stable over a range of temperatures that can be encountered during operation of a supercapacitor, for example, from about −20° C. to about 300° C., including all ranges and subranges therebetween.

The a-MEGO materials described herein, together with the methods to prepare a-MEGO materials can also be useful hydrogen storage applications, gas adsorption applications, adsorption of analytes from liquid and/or gaseous samples, as catalyst supports for fuel cells, and/or as supports for Li-ion particles or other nanoparticles (e.g., Si and/or Sn particles for battery anodes, $MnO_2$ particles for hybrid ultracapacitors), or a combination thereof. In one aspect, the inventive a-MEGO material is disposed in an electrode of a supercapacitor. In another aspect, the inventive a-MEGO material is disposed in a fuel cell electrode as a catalyst support. In yet another aspect, the inventive a-MEGO material is disposed in an electrode of a lithium ion battery. In still other aspects, the inventive a-MEGO material can be disposed in an electrode of an energy storage and/or conversion device, or in an analyzer as an adsorption media.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Synthesis of a-MEGO and a-TEGO from MEGO and TEGO

Graphite oxide (GO) powders made from the modified Hummers' method were irradiated in a domestic microwave oven (GE, JES0736SM1SS) operated at 1100 W for 1 minute. During the irradiation, a large volume expansion of the GO powder occurred and the black, fluffy MEGO powder obtained was collected for activation. Typically, 400 mg MEGO powder was dispersed in 20 ml 7M aqueous KOH solution and stirred for 4 hours at a speed of 400 rpm, followed by another 20 hours of static soaking in ambient conditions. The extra KOH solution was removed by briefly filtering the mixture through a polycarbonate membrane (Whatman, 0.2 µm); then the mixture was dried in the lab environment at 65° C. for 24 hours. A control MEGO sample, made with the same soaking-drying process but with no KOH was also prepared, and 85% of the mass remained after drying. A KOH to MEGO ratio was calculated by assuming the MEGO in the dry MEGO/KOH mixture gave the same mass yield, i.e., 85%.

It was found that the KOH uptake (KOH/MEGO ratio) was linearly dependent on the molarity of the KOH solution, with other process parameters held constant (such as the amount of MEGO from the same batch of GO and the volume of KOH solution). For the MEGO soaked in 20 ml 7M KOH as described above, the KOH/MEGO ratio was 8.9±0.3. The dry MEGO/KOH mixture was heated at 800° C. for 1 hour in a horizontal tube furnace (50-mm diameter), with an argon flow of 150 sccm and working pressure of ~400 Torr. The temperature was ramped from room temperature to 800° C. at 5° C./min.

After cooling down in vacuum, the sample was repeatedly washed by de-ionized water until a pH value of 7 was reached. Then the sample was dried at 65° C. in ambient for 2 hours, followed by thermal annealing at 800° C. in vacuum (0.1 Torr) for 2 hours, to generate 'activated MEGO' (a-MEGO) powders. Thermally exfoliated graphite oxide ('TEGO'), made by 'thermal shocking' of GO at 250° C. in ambient, was activated following the same process. The a-MEGO and a-TEGO so obtained were characterized in a variety of ways, and supercapacitor measurements were made, as described in the main text and below.

Example 2

Characterization Methods

The a-MEGO was analyzed by scanning electron microscopy (SEM, Hitachi S5500, kV), transmission electron microscopy (TEM, JEOL 2010F, 200 kV at UT-Austin; TEM, spherical aberration corrected FEI Titan 80/300, 80 kV at BNL; the spherical and chromatic aberration corrected TEAM instrument at LBNL, see: ncem.lbl.gov/TEAM-project/) and scanning TEM (Aberration corrected Hitachi HD2700C at BNL). The exit wave reconstructed image shown in FIG. F was processed using the MacTempas Exit Wave Reconstruction Package (totalresolution.com) from a series of 41 images, ranging from 28 nm above Gaussian to 28 nm below Gaussian and with 1.4 nm focal step size.

The measurement of the nitrogen adsorption isotherms was done with a Quantachrome Nova 2000 at 77.4 K to obtain the surface areas of a-MEGO samples from different KOH/MEGO ratios, and for the comparison between MEGO control and a-MEGO samples. Detailed adsorption experiments with nitrogen (77.4 K), argon (87.3 K), and carbon dioxide (273.2 K) were also performed with a Quantachrome Autosorb iQ MP in order to assess surface area and pore characteristics of the a-MEGO. Nitrogen adsorption with the Quantachrome Autosorb iQ MP was also carried out on the a-TEGO. The samples were outgassed at 150° C. for 16 hours under turbomolecular vacuum pumping prior to the gas adsorption measurements.

Samples were sealed into glass Lindemann capillaries and x-ray diffraction patterns collected at the X12A beamline of the National Synchrotron Light Source, using x-rays of 0.699 Angstrom wavelength, in parallel beam geometry. Background from the glass was normalized at high angles, and the data converted to CuK for the plot shown in FIG. 5A. Micro Raman was performed on a Witec Alpha 300 confocal Raman system with a laser wavelength of 532 nm. Lorentzian fitting was done to obtain the positions and widths of the D and G bands in the Raman shift spectra. Fourier transform infrared spectroscopy (FTIR) was done with a Perkin Elmer Spectrum BX.

X-ray photoelectron spectroscopy (XPS) was performed with two separate systems equipped with monochromatic Al Kα sources (Kratos AXIS Ultra DLD, Omicron Nanotechnology XM1000/EA 125 U7) to analyze the chemical composition of the samples. Combustion elemental analysis was performed at Atlantic Microlab, Inc. (Georgia, USA) for determination of the C, O, and H content. Electron paramagnetic resonance (EPR) measurements of a-MEGO were done with a Bruker EMX Plus (X band, 295 K) with 2,2-Di(4-tert-octylphenyl)-1-picrylhydrazyl (DPPH, Sigma Aldrich 257612) as a standard. Electron energy loss spectroscopy (EELS, Gatan) was carried out in a JEOL 2010 TEM on commercial graphite powder (SP-1 graphite, Bay Carbon, Inc. Michigan, USA; the same graphite used to make the GO that was converted to MEGO), MEGO, and a-MEGO samples, respectively. High resolution SEM, STEM and EELS were performed using a dedicated STEM Hitachi HD2700C, equipped with a cold-field emission gun, a CEOS aberration corrector and a high-resolution (0.35 eV) EELS Spectrometer (Gatan, Enfina).

As noted above, it was necessary to ignore the large percentage of the a-MEGO on the TEM grid, as it was too thick to perform EELS measurements on. It is possible to quantify the amount of $sp^2$-bonding by measuring the ratio between $\pi^*$ bonding and $\pi^*+\delta^*$ bonding using EELS. The relative amount of $sp^2$ carbon atoms was calculated by using the formula:

$$\frac{sp^2}{sp^2+sp^3} = \frac{\frac{I^u_{\pi^*}}{I^u_{\pi^*}+I^u_{\sigma^*}}}{\frac{I^g_{\pi^*}}{I^g_{\pi^*}+I^g_{\sigma^*}}},$$

where the Iu and Ig represent the integrated intensity for specific energy ranges of the spectra for the a-MEGO and graphite (assumed to be 100% $sp^2$ carbon), respectively. Comparisons were made between a-MEGO and graphite films of approximately the same thickness (as measured by comparing the intensity in the zero loss peak with the intensity in the low-loss region). $I\pi^*$ and $I\sigma^*$ are the peak intensities due to the $1s \rightarrow \pi^*$ and $1s \rightarrow \sigma^*$ transitions, corresponding to $sp^2$ and $sp^3$ hybridized carbon atoms. Two windows, 283.2-287.2 eV and 292.5-312.5 eV for the $1s \rightarrow \pi^*$ and $1s \rightarrow \sigma^*$ transitions, respectively, were integrated to generate the peak intensities. The resulting analyses reveal the fraction of $sp^2$ bonding for the a-MEGO is 98±2%. The statistical error of 2% is consistent with the values expected using this approach. Complementary XPS measurements were also taken of the a-MEGO powder material with the Omicron Nanotechnology system (analyzer acceptance angle ±8, takeoff angle 45°, pass energy 15 eV) to establish the relative amount of $sp^2$ carbon for comparison to the EELS measurements. The powder sample was supported on a surface that was nearly free of carbon and oxygen and that consisted of a Pt thin film that had been evaporated on a Si wafer. XPS data was analyzed using the Casa XPS fitting package and an asymmetric Doniach-Sunjic (DS) peak shape was used to fit the $sp^2$ component, as required for conductive $sp^2$ carbon materials.

Example 3

Supercapacitor Measurements

A two-electrode cell configuration was used to measure the performance of supercapacitors with the a-MEGO and a-TEGO materials. 5 wt % Polytetrafluoroethylene (PTFE; 60 wt % dispersion in water) was added to the a-MEGO and a-TEGO as a binder.

Typically, the a-MEGO (or a-TEGO) and PTFE was mixed into a paste using a mortar and pestle, rolled into uniform thickness sheets whose thickness ranged 40 to 50 μm thick (from sheet to sheet) and punched into ~1-cm diameter electrodes. A pair of typical electrodes had a weight between 2.5 and 4.0 mg after drying overnight at a ~100° C. under vacuum. The two identical (by weight and size) electrodes were assembled in a test cell, which consisted of two current collectors, two electrodes, and an ion-porous separator (Celgard® 3501) supported in a test fixture consisting of two stainless steel plates. Conductive carbon coated aluminum foils (Exopack™ 0.5 mil 2-6 side coating) were used as current collectors. 1-butyl-3-methylimidazolium tetrafluoroborate (BMIM $BF_4$) was obtained commercially from Sigma Aldrich and diluted in acetonitrile (AN) with a weight ratio of 1:1 (with some testing done with neat BMIM $BF_4$). The tetraethylammonium tetrafluoroborate (TEA $BF_4$, Sigma Aldrich) was prepared at 1.0 M in AN. The 1-Ethyl-3-methylimidazolium bis(trifluoromethylsulfonyl)imide (EMIM TFSI, Sigma Aldrich) was used as purchased.

The assembly of the test cell was done in a glove box filled with Ar. Gravimetric capacitance from galvanostatic charge/discharge was calculated by using the formula $$C_{carbon} = \frac{4I_{cons}}{mdV/dt},$$

where I is the constant current and m the total mass for both carbon electrodes, and dV/dt was calculated from the slope obtained by fitting a straight line to the discharge curve over the range of Vmax (the voltage at the beginning of discharge) to ½ Vmax. Based on a RC model, the capacitance was also calculated from the frequency response analysis, by C=−1/(πfZ″), where f is frequency in Hz and Z″ is the imaginary part of the impedance, to show the trend of changes in capacitance with frequency. The energy density was estimated by using the formula $E_{cell}=CV_{max}^2/8$, where the cell mass (two carbon electrodes) was normalized. Effective series resistance (ESR) was estimated using the voltage drop at the beginning of the discharge, Vdrop, at certain constant current Icons, with the formula RESR=Vdrop/(2Icons). The power density, calculated from the discharge data at certain constant current Icons, and normalized with the weight of the carbon cell (two carbon electrodes) is given by $$P = \frac{(V_{max} - V_{drop})^2}{4R_{ESR}m}.$$

Example 4

EPR Measurements of a-MEGO

FIG. 4 illustrates EPR data of a-MEGO with DPPH used as a standard. Samples of a-MEGO (SSA ~2,520 m²/g), and of DPPH diluted in KCl, were measured in 4 mm tubes under similar conditions except for the number of scans. 400 scans were run on a-MEGO to obtain sufficient signal/noise ratio; only 40 scans were run on DPPH to avoid saturation. Double integrated areas of as-measured curves were normalized with the number of scans and mass of each sample. A concentration of ~2×1,016 spins/g was estimated for this a-MEGO sample, corresponding to a concentration of 0.4 spins per million carbon atoms.

Example 5

XPS Data for a-MEGO and Analysis

Figure 6:
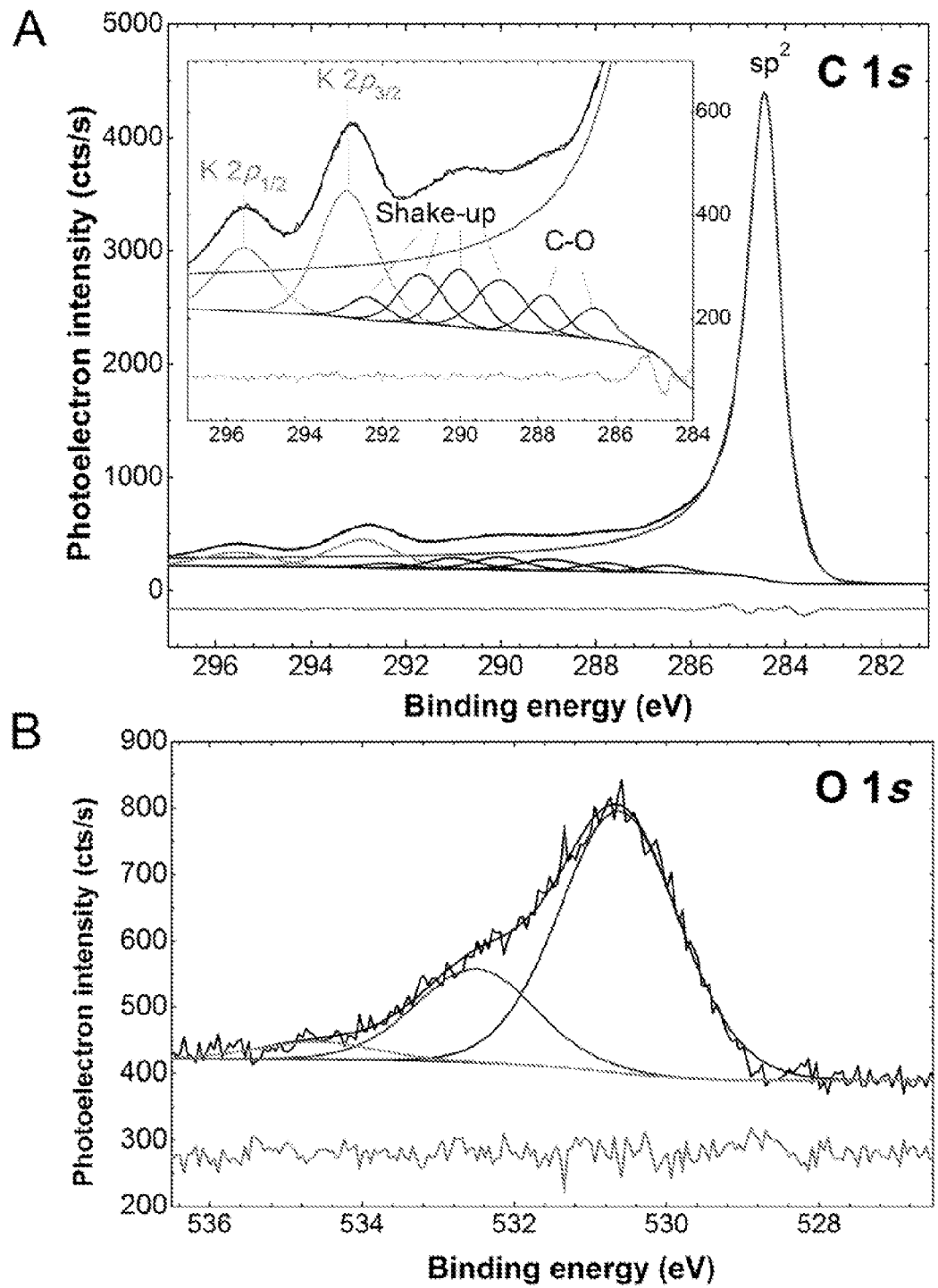
FIG. 6 illustrates XPS data of an a-MEGO sample having a SSA of about 2,520 m$^2$/g (A) fit to the C 1s region, and (B) the O 1s region.

FIG. 6 illustrates detailed XPS analysis of a-MEGO sample (SSA ~2520 m2/g). (A) Fit to the C1s region is shown, with detailed spectrum inset. The main sp2 carbon peak is a Doniach-Sunjic line with asymmetry parameter α=0.20 and FWHM 0.78 eV, which are reasonably close to values for these parameters in fits to highly oriented pyrolytic graphite (HOPG) and glassy carbon. Multiple states are also present on the high binding energy side of the main $sp^2$ peak. An $sp^3$ component, if present, is expected at +0.8 to +0.9 eV above the $sp^2$ component in the C 1s spectrum. Attempts to fit the spectral envelope with an $sp^3$ component indicate that $sp^3$ carbon is below the limit of detection of XPS (approximately 1 at. %). Two C 1s states are observed at +2.0 and +3.3 eV above the main $sp^2$ peak (with widths of 1.2 eV) and are attributed to C—O bonding with corresponding states observed in the O 1s And impurity K 2p spectra. Several shake-up features are also present at +4.4, +5.5, +6.5 and +7.9 eV above the main $sp^2$ peak (widths of 1.5, 1.3, 1.3 and 1.1 eV respectively) and are in good agreement with fits to the extended shake-up energy loss spectrum of glassy carbon and highly oriented pyrolytic graphite (HOPG) by Leiro et. al.

Residual potassium (<2 at. %) from the KOH activation process is detected as a K 2p doublet with the K $2p^{3/2}$ state observed at 292.9 eV. (B) The O 1s region is shown and composed of three components at 530.6 eV (K2CO3), 532.5 eV (KHCO3) and 534.6 eV (KOH). It is noted that the C 1s shake up features described above make the unequivocal deconvolution of a carbonate bond problematic. Residual peak fitting error is shown beneath all spectra.

Example 6

Raman and FTIR Analysis of a-MEGO

Figure 7:
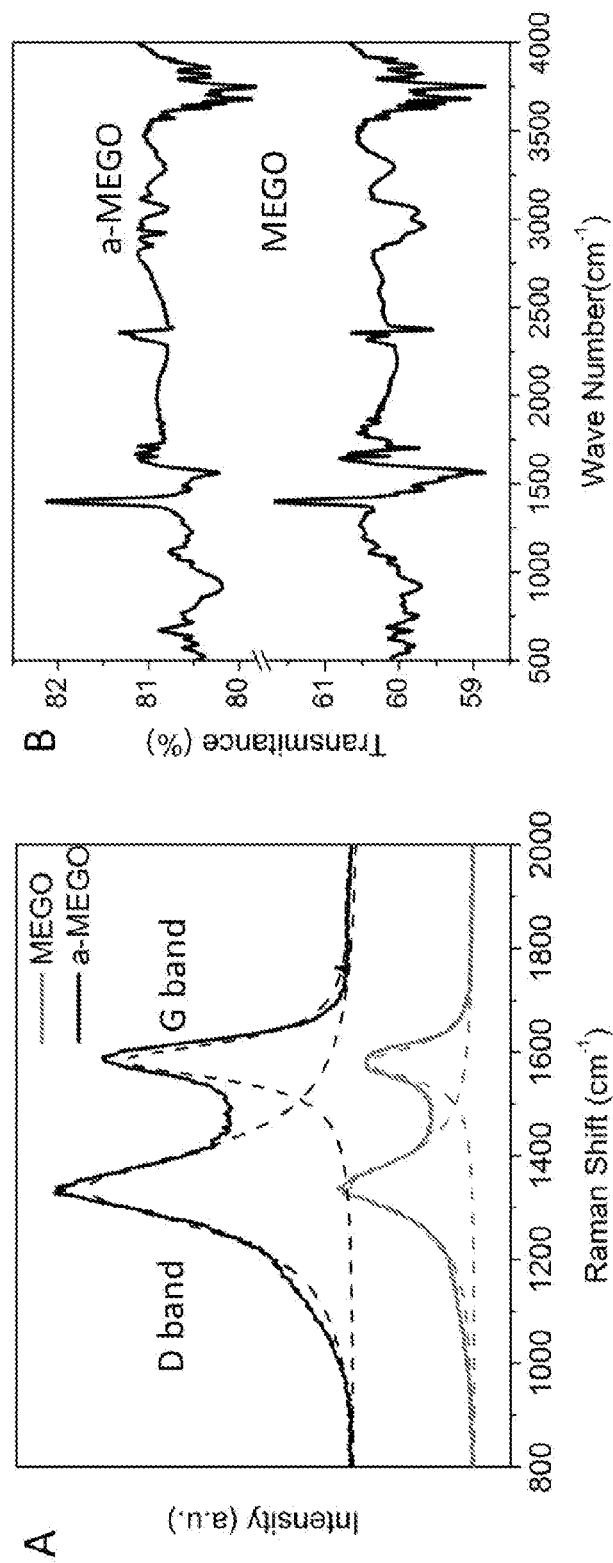
FIG. 7 illustrates (A) Raman spectroscopy and (B) Fourier transform infrared spectroscopy data for an a-MEGO sample and a MEGO control sample.

FIG. 7 illustrates (A) Raman of a-MEGO and MEGO control sample. The Id/Ig slightly increases from ~1.16 in MEGO to ~1.19 in a-MEGO. From Lorentzian fitting, the D band FWHM increases from ~135 to ~183 cm−1. (B) FTIR transmittance spectra. The following bands were observed: O—H stretching (3200-3400 cm−1), C—H aliphatic (2800-3000 cm−1), C=O and C—O stretching (1640-1750 cm−1), aromatic C=C stretching (1400-1600 cm−1) and bands related to aromatic content (700-920 cm−1) such as out of plane C—H bending (~910 cm−1) with different degrees of substitution. Compared with the MEGO control sample, a-MEGO shows lower signals from the oxygen or hydrogen containing groups.

Example 7

Comparison of $N_2$ BET Data for MEGO and a-MEGO

FIG. 9 illustrates $N_2$ adsorption/desorption analysis of a-MEGO (~2,520 m²/g) with MEGO as control. (A) $N_2$ isotherm curves at 77.4 K. (B) Cumulative pore volume versus pore diameter plots obtained from the adsorption isotherm in (A). NLDFT analysis for carbon with slit/cylindrical model was used on the adsorption data to obtain the pore volumes.

Example 8

QSDFT Pore Size Distribution of a-MEGO

FIG. 10 'Quenched solid density functional theory' (QSDFT) pore size distribution of a-MEGO. In addition to the NLDFT pore size distribution shown in FIG. 8B (which was based on NLDFT assuming a slit/cylindrical pore hybrid model), nitrogen (77.4 K) and argon (87.3 K) adsorption isotherms were analyzed by assuming a slit pore model and QSDFT, which quantitatively accounts for the surface geometrical inhomogeneity. It follows that this pore size distribution essentially resembles the distribution from the slit/cylindrical pore model shown in the manuscript (FIG. 8B); however, the mesopore size is slightly smaller in the slit pore QSDFT model.

Example 9

Supercapacitor Performance of a-MEGO with TEA $BF_4$/AN Electrolyte

FIG. 12 Supercapacitor performance of a-MEGO (SSA ~3,100 m²/g) with 1.0 M TEA $BF_4$/AN electrolyte. (A) CV curves for different scan rates. Rectangular shapes indicate the capacitive behavior. (B) Galvanostatic charge/discharge curves of a-MEGO based supercapacitor under different constant currents. The specific capacitances calculated from the discharge curves are 154, 145 and 141 F/g, for the constant currents of 0.8, 1.9 and 3.8 A/g, respectively. From the discharge data obtained at the constant current of 0.8 A/g, the energy density and power density were estimated as 39 Wh/kg and 145 kW/kg, respectively, when normalized with the total weight of two a-MEGO electrodes. (C) Nyquist plot, displaying a similar resistance as that of a-MEGO in BMIM $BF_4$/AN electrolyte. (D) Frequency response of the capacitance of the a-MEGO supercapacitor.

Example 10

Stability Testing of Supercapacitor Having a-MEGO with BMIM $BF_4$ Electrolyte

Figure 13:
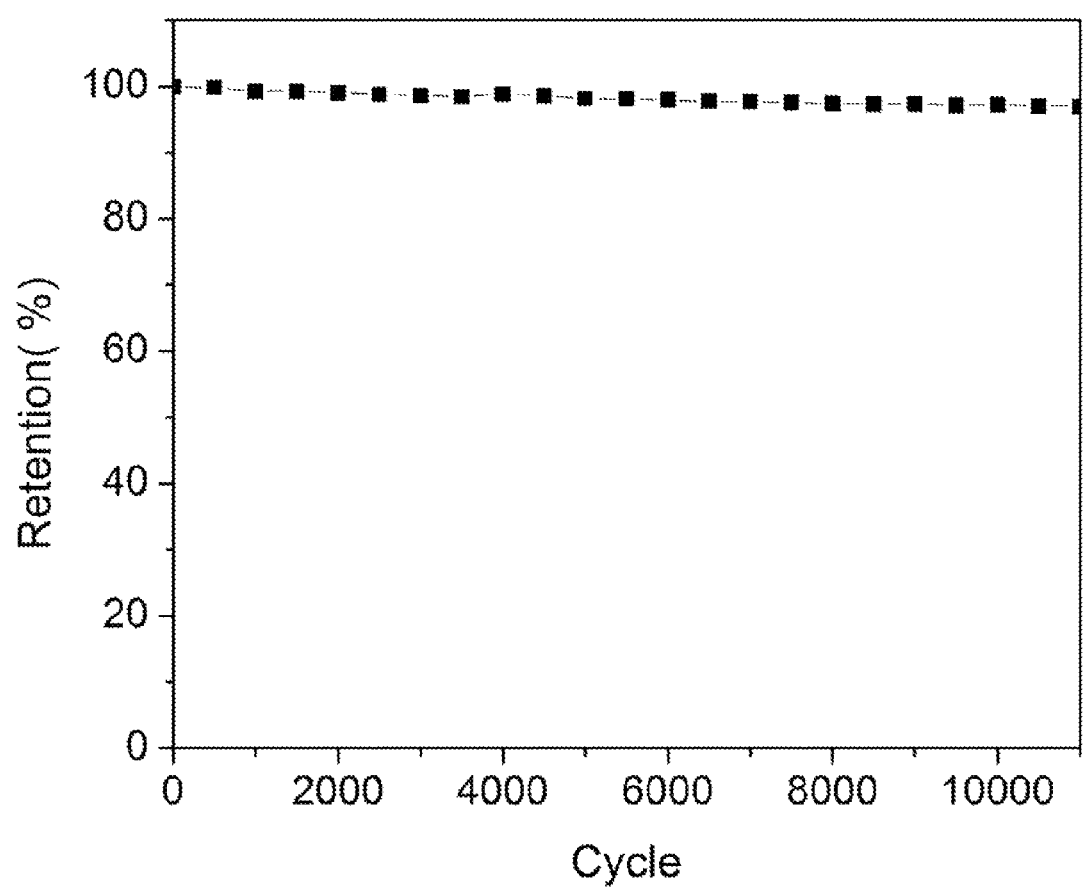
FIG. 13 illustrates data from constant life cycle stability testing of an a-MEGO based supercapacitor in neat BMIM $BF_4$, where the a-MEGO had an SSA of about 3,100 m$^2$/g.

FIG. 13 illustrates testing of the a-MEGO (with surface area of ~3,100 $m^2$/g) based supercapacitor in neat BMIM $BF_4$ over 10000 cycles. Constant current cycles were run at a rate of 2.5 A/g. Retention of 97% was obtained after 10000 cycles. In this example, the pure IL was used as electrolyte to minimize possible contamination.

Example 11

Supercapacitor Performance of a-MEGO with EMIM TFSI Electrolyte

FIG. 14 illustrates supercapacitor performance of a-MEGO (SSA ~3,100 $m^2$/g) in neat EMIM TFSI electrolyte. (A) CV curves under different scan rates. (B) Galvanostatic charge/discharge curves under different constant currents. The specific capacitances calculated from the discharge curves with maximum voltage of 3.5 V are 200, 192 and 187 F/g for the currents of 0.7, 1.8 and 3.5 A/g, respectively. The normalized ESR is 0.025 Ω·g. From the discharge data obtained at the constant current of 0.7 A/g, the energy density and power density were estimated as 85 Wh/kg and 122 kW/kg, when normalized with the total weight of the two a-MEGO electrodes.

Example 12

$N_2$ Adsorption Results of a-TEGO

Figure 15:
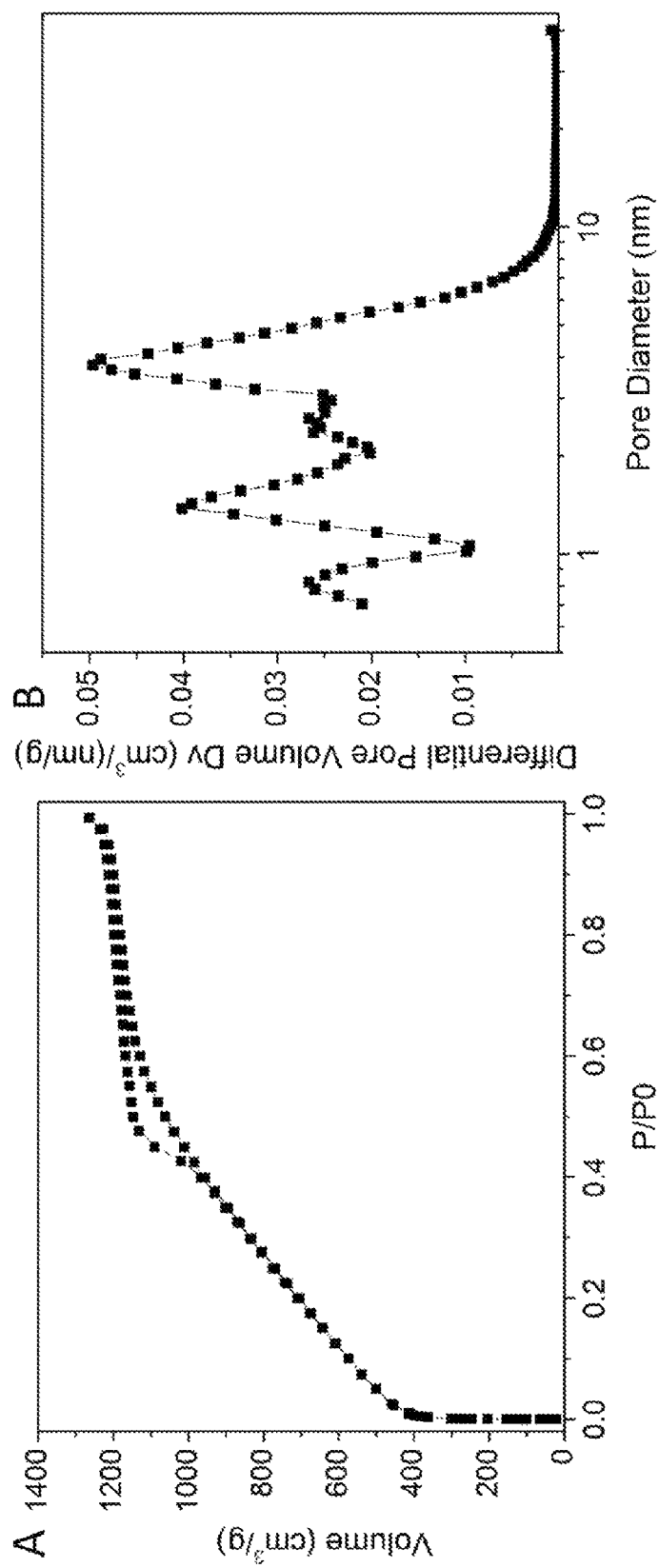
FIG. 15 illustrates illustrates (A) high resolution, low pressure isotherms, and (B) pore size distribution for $N_2$ adsorption, calculated using a slit/cylindrical NLDFT model, from $N_2$ adsorption/desorption analysis of an activated thermally exfoliated graphite oxide (a-TEGO) sample having a BET SSA of about 2,675 m$^2$/g.

FIG. 15 illustrates $N_2$ adsorption/desorption analysis of a-TEGO. (A) High resolution, low pressure isotherm, from which a high BET SSA of 2,675 $m^2$/g (calculated in the linear relative pressure range from 0.1 to 0.3) is obtained. (B) Pore size distribution for $N_2$ adsorption (calculated using a slit/cylindrical NLDFT model).

Example 13

Supercapacitor Performance of a-TEGO with BMIM $BF_4$/AN Electrolyte

Figure 16:
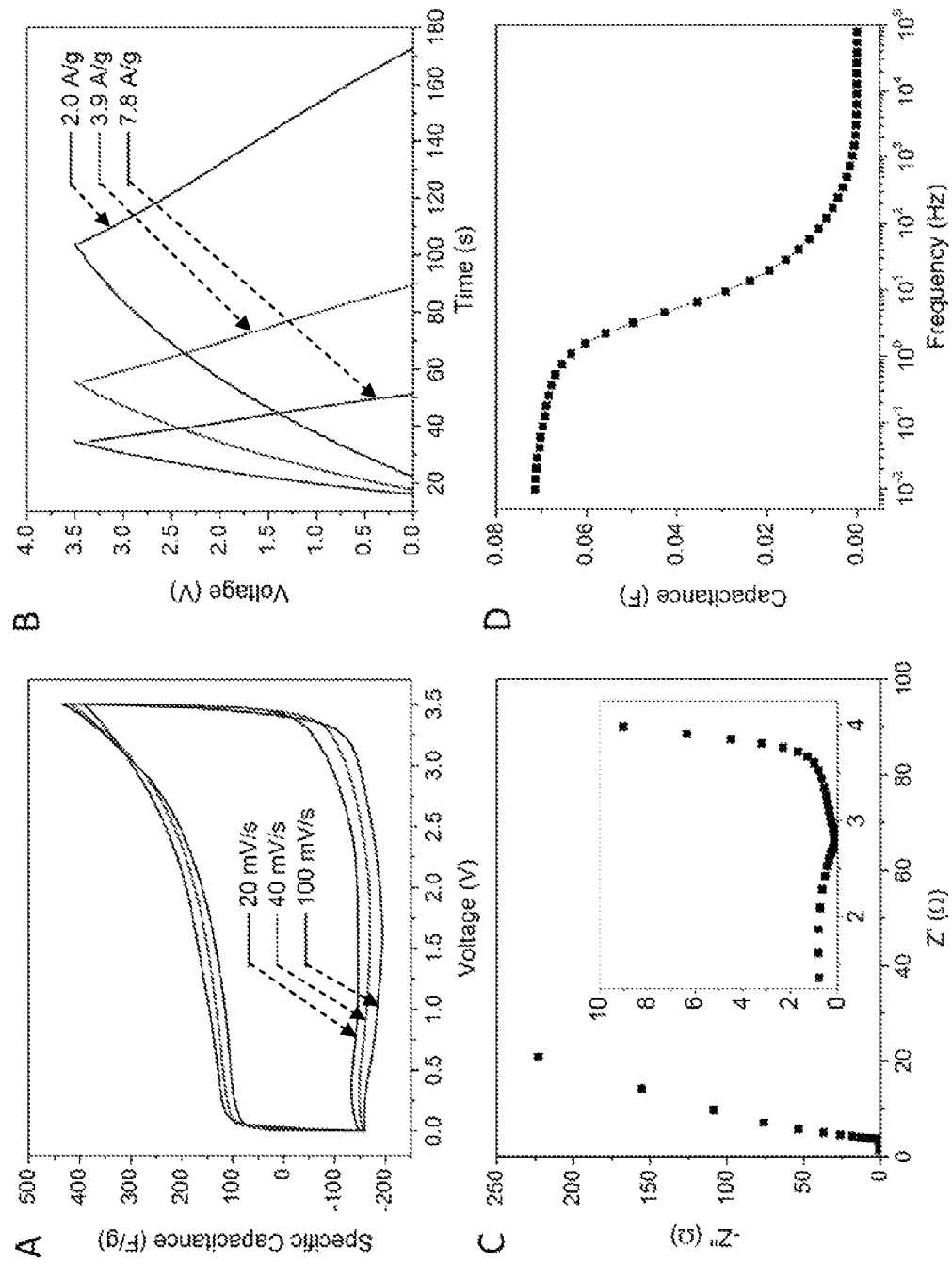
FIG. 16 illustrates (A) cyclic voltammetry (CV) curves for various scan rates of an a-TEGO material having a SSA of about 2,700 m$^2$/g in BMIM $BF_4$/AN electrolyte, (B) galvanostatic charge/discharge curves under differing constant currents, (C) Nyquist plot, illustrating the imaginary and real components of the impedance, and (D) frequency response of the gravimetric capacitance of an a-MEGO supercapacitor.

FIG. 16 illustrates supercapacitor performance of a-TEGO (SSA ~2,700 $m^2$/g) in the BMIM $BF_4$/AN electrolyte. (A) CV curves for different scan rates. (B) Galvanostatic charge/discharge curves under different constant currents. The capacitance values calculated are 156, 154 and 154 F/g for the currents of 2.0, 3.9 and 7.8 A/g, respectively. From the discharge data obtained at the constant current of 2.0 A/g, the ESR, energy density and power density were estimated as 4.1Ω, 66 Wh/kg and 282 kW/kg, respectively. (C) Nyquist plot for the a-TEGO based supercapacitor. (D) Frequency response of the capacitance of the a-TEGO supercapacitor in BMIM $BF_4$/AN electrolyte.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. An activated expanded graphite oxide prepared by:
   exposing a graphite oxide to microwave energy from about 300 MHz to about 300 GHz to provide an expanded graphite oxide; and
   contacting the expanded graphite oxide with a basic or reducing activator to form an activated expanded graphite oxide, wherein the activated expanded graphite oxide has a three-dimensional distribution of mesopores, wherein at least a portion of the mesopores have a width of from about 0.5 nm to about 10 nm.

2. The activated expanded graphite oxide of claim 1, wherein the activated expanded graphite oxide has a specific surface area of at least about 1,280 $m^2$/g.

3. The activated expanded graphite oxide product of claim 1, wherein the activated expanded graphite oxide has an electrical conductivity of at least about 500 S/m.

4. The activated expanded graphite oxide of claim 1, wherein the activated expanded graphite oxide has a pore volume of up to about 2.14 $cm^3$/g.

5. The activated expanded graphite oxide of claim 1, wherein the activated expanded graphite oxide has a specific capacitance of at least about 160 F/g.

6. The activated expanded graphite oxide of claim 1, wherein the activated expanded graphite oxide has a volumetric capacitance of at least about 60 F/$cm^3$.

7. The activated expanded graphite oxide of claim 1, wherein the activated expanded graphite oxide has an energy density of at least about 70 Wh/kg.

8. The activated expanded graphite oxide of claim 1, wherein the activated expanded graphite oxide has a power density of at least about 250 kW/kg.

9. The activated expanded graphite of claim 1, wherein at least a portion of the pore walls comprise curved surfaces.

10. The activated expanded graphite oxide of claim 1, wherein the activated expanded graphite oxide comprises a plurality of n-membered rings, wherein each of the n-membered rings are positioned in the same plane, and wherein n is from about 5 to about 8.

11. The activated expanded graphite oxide of claim 1, wherein the activator at least partially digests the expanded graphite oxide to form the activated expanded graphite oxide.

12. The activated expanded graphite oxide of claim 1, wherein the activator restructures at least a portion of the expanded graphite oxide to form the activated expanded graphite oxide.

13. The activated expanded graphite oxide of claim 1, wherein the activator comprises potassium hydroxide (KOH).

14. The activated expanded graphite oxide of claim 1, wherein the microwave energy is between about 100 W and about 2,500 W.

15. The activated expanded graphite oxide of claim 1, wherein the activated the activated expanded graphite oxide has a specific surface area of up to about 3,100 $m^2$/g.

16. An electrode comprising an activated expanded graphite oxide prepared by:
   exposing a graphite oxide to microwave energy from about 300 MHz to about 300 GHz to provide an expanded graphite oxide; and
   contacting the expanded graphite oxide with a basic or reducing activator to form an activated expanded graphite oxide, wherein the activated expanded graphite oxide has a three-dimensional distribution of Mesopores, wherein at least a portion of the mesopores have a width of from about 0.5 nm to about 10 nm.

17. The electrode of claim 16, wherein the activated expanded graphite oxide has a specific surface area of at least about 1,280 $m^2/g$.

18. The electrode of claim 16, wherein the activated expanded graphite oxide has an electrical conductivity of at least about 500 S/m.

19. The electrode of claim 16, the activated expanded graphite oxide has a pore volume of up to about 2.14 $cm^3/g$.

20. The electrode of claim 16, wherein the activated expanded graphite oxide has a specific capacitance of at least about 160 F/g.

21. The electrode of claim 16, wherein the activated expanded graphite oxide has a volumetric capacitance of at least about 60 $F/cm^3$.

22. The electrode of claim 16, wherein the activated expanded graphite oxide has an energy density of at least about 70 Wh/kg.

23. The electrode of claim 16, wherein the activated expanded graphite oxide has a power density of at least about 250 kW/kg.

24. The electrode of claim 16, wherein at least a portion of the pore walls of the activated expanded graphite comprise curved surfaces.

25. The electrode of claim 16, wherein the activated expanded graphite oxide comprises a plurality of n-membered rings, wherein each of the n-membered rings are positioned in the same plane, and wherein n is from about 5 to about 8.

26. The electrode of claim 16, wherein the activator at least partially digests the expanded graphite oxide to form the activated expanded graphite oxide.

27. The electrode of claim 16, wherein the activator restructures at least a portion of the expanded graphite oxide to form the activated expanded graphite oxide.

28. The electrode of claim 16, wherein the activator comprises potassium hydroxide (KOH).

29. The electrode of claim 16, wherein the microwave energy is between about 100 W and about 2,500 W.

30. The electrode of claim 16, wherein the activated the activated expanded graphite oxide has a specific surface area of up to about 3,100 $m^2/g$.

* * * * *